(12) United States Patent
Marder et al.

(10) Patent No.: US 12,366,535 B2
(45) Date of Patent: Jul. 22, 2025

(54) TAUTOMERIC SENSING USING A COVALENT ORGANIC FRAMEWORK

(71) Applicants: Northwestern University, Evanston, IL (US); Georgia Tech Research Corporation, Atlanta, GA (US)

(72) Inventors: Seth R. Marder, Atlanta, GA (US); William R. Dichtel, Wilmette, IL (US); Samik Jhulki, Atlanta, GA (US); Stephen Barlow, Atlanta, GA (US); Austin M. Evans, Evanston, IL (US)

(73) Assignees: Northwestern University, Evanston, IL (US); Georgia Tech Research Corporation, Atlanta, GA (US)

( * ) Notice: Subject to any disclaimer, the term of this patent is extended or adjusted under 35 U.S.C. 154(b) by 701 days.

(21) Appl. No.: 17/753,517

(22) PCT Filed: Sep. 8, 2020

(86) PCT No.: PCT/US2020/049668
§ 371 (c)(1),
(2) Date: Mar. 4, 2022

(87) PCT Pub. No.: WO2021/046516
PCT Pub. Date: Mar. 11, 2021

(65) Prior Publication Data
US 2022/0341851 A1 Oct. 27, 2022

Related U.S. Application Data

(60) Provisional application No. 62/896,358, filed on Sep. 5, 2019.

(51) Int. Cl.
*G01N 21/81* (2006.01)
*G01N 21/78* (2006.01)

(52) U.S. Cl.
CPC ............ *G01N 21/81* (2013.01); *G01N 21/78* (2013.01)

(58) Field of Classification Search
CPC ...... G01N 21/78; G01N 21/783; G01N 21/81; Y10T 436/17; Y10T 436/173845; Y10T 436/20; Y10T 436/200833; Y10T 436/203332; Y10T 436/204998
USPC ....... 436/106, 111, 127, 128, 131, 133, 164, 436/172; 422/400, 82.05, 82.08, 82.09
See application file for complete search history.

(56) References Cited

U.S. PATENT DOCUMENTS

| 8,735,161 B2 | 5/2014 | Yaghi et al. |
| 10,036,730 B2 | 7/2018 | Wilkinson et al. |
| 10,335,765 B2 | 7/2019 | Shim et al. |
| 2017/0247493 A1* | 8/2017 | Banerjee ................ C12N 11/04 |

OTHER PUBLICATIONS

Li et al. Chemistry of Materials, vol. 30, pp. 5743-5749, Jul. 31, 2018.*

(Continued)

*Primary Examiner* — Maureen Wallenhorst
(74) *Attorney, Agent, or Firm* — Quarles & Brady LLP

(57) ABSTRACT

Disclosed herein are sensors including a covalent organic framework (COF). The COF includes tautomerically active subunits (TAS) capable of reversible iminol-to-ketoenamine tautomerism between a first tautomer and a second tautomer and linking groups. Methods of detecting analytes with the sensors are also disclosed.

21 Claims, 15 Drawing Sheets

(56) References Cited

OTHER PUBLICATIONS

Kandambeth et al. Nature Communications, vol. 6:6786, pp. 1-10, Apr. 10, 2015.*

Xu et al. Nature Communications, vol. 14:4215, pp. 1-10, Jul. 14, 2023.*

Chen et al. Nano-Micro Letters, vol. 15:149, pp. 1-16, Jun. 7, 2023.*

Li et al. Frontiers of Optoelectronics, vol. 15:38, pp. 1-42, Sep. 19, 2022.*

Jhulki et al. Journal of the American Chemical Society, vol. 142, pp. 783-791, Jan. 2, 2020.*

Antonov, L.; Deneva, V.; Simeonov, S.; Kurteva, V.; Nedeltcheva, D.; Wirz, J., Exploiting tautomerism for switching and signaling. Angew. Chem., Int. Ed. 2009, 48 (42), 7875-7878.

Ascherl, L.; Evans, E.W.; Hennemann, M.; Di Nuzzo, D.; Hufnagel, A. G.; Beetz, M.; Friend, R.H.; Clark, T.; Bein, T.; Auras, F., Solvatochromic covalent organic frameworks. Nat. Comm. 2018, 9 (I), 3802.

Bisbey, R. P.; Dichtel, W.R., Covalent organic frameworks as a platform for multidimensional polymerization. ACS Cent. Sci. 2017, 3 (6), 533-543.

Chong, J. H.; Sauer, M.; Patrick, B. O.; MacLachlan, M. J., Highly stable keto-enamine salicylideneanilines. Org. Lett. 2003, 5 (21), 3823-3826.

Colson, J. W.; Dichtel, W.R., Rationally synthesized two-dimensional polymers. Nat. Chem. 2013, 5 (6), 453-65.

Connolly, M. L., Analytical Molecular-Surface Calculation. J Appl Crystallogr 1983, 16 (Oct), 548-558.

Daugherty, M. C.; Vitaku, E.; Li, R. L.; Evans, A. M.; Chavez, A. D.; Dichtel, W.R., Improved synthesis of f3-ketoenamine-linked covalent organic frameworks via monomer exchange reactions. Chem Commun 2019, 55 (18), 2680-2683.

DeBlase, C.R.; Silberstein, K. E.; Truong, T.-T.; Abrufia, H. D.; Dichtel, W.R., f3-Ketoenamine-linked covalent organic frameworks capable of pseudocapacitive energy storage. J Am. Chem. Soc. 2013, 135 (45), 16821-16824.

Evans, A. M.; Ryder, M. R.; Flanders, N. C.; Vitaku, E.; Chen, L. X.; Dichtel, W.R., Buckling of Two-Dimensional Covalent Organic Frameworks under Thermal Stress. Ind Eng. Chem. Res. 2019, 58 (23), 9883-9887.

Finsy, V.; Kirschhock, C. E.; Vedts, G.; Maes, M.; Alaerts, L.; De Vos, D. E.; Baron, G. V.; Denayer, J. F., Framework breathing in the vapour-phase adsorption and separation of xylene isomers with the metal-organic framework MIL-53. Chem.-Eur. J 2009, 15 (31 ), 7724-7731.

Hansen, M. R.; Graf, R.; Spiess, H. W., Solid-State NMR in Macromolecular Systems: Insights on How Molecular Entities Move. Accounts Chem Res 2013, 46 (9), 1996-2007.

Huang, N.; Wang, P.; Jiang, D., Covalent organic frameworks: a materials platform for structural and functional designs. Nat. Rev. Alat. 2016, 1 (IO), 16068.

Jagadesan et al 'The excited-state intramolecular proton transfer properties of three imine-linked two-dimensional porous organic polymers' Journal of Matericals Chemistry C, 2017, 5, 5676- 5679.

Jiang, Z., Gixsgui: a Matlab Toolbox for Grazing-Incidence X-Ray Scattering Data Visualization and Reduction, and Indexing of Buried Three-Dimensional Periodic Nanostructured Films. J Appl. C,ystallogr. 2015, 48, 917-926.

Kandambeth, S.; Mallick, A.; Lukose, B.; Mane, M. V.; Heine, T.; Banerjee, R., Construction of crystalline 2D covalent organic frameworks with remarkable chemical (acid/base) stability via a combined reversible and irreversible route. J Am. Chem. Soc. 2012, 134 (48), 19524-7.

Kandambeth, S.; Shinde, D. B.; Panda, M. K.; Lukose, B.; Heine, T.; Banerjee, R., Enhancement of chemical stability and crystallinity in porphyrin-containing covalent organic frameworks by intramolecular hydrogen bonds. Angew. Chem., Int. Ed 2013, 52 (49), 13052-13056.

Kandambeth, S.; Venkatesh, V.; Shinde, D. B.; Kumari, S.; Halder, A.; Verma, S.; Banerjee, R., Self-templated chemically stable hollow spherical covalent organic framework. Nat. Comm. 2015, 6, 6786.

Karolewski, A; Stein, T.; Baer, R.; Kummel, S., Communication: Tailoring the Optical gap in Light-Harvesting Molecules. J Chem. Phys. 2011, 134, 151101.

Korzdorfer, T.; Bredas, J.-L., Organic Electronic Materials: Recent Advances in the DFT Description of the Ground and Excited States Using Tuned Range-Separated Hybrid Functionals. Acc. Chem. Res. 2014, 47, 3284-3291.

Kuhnert, N.; Lopez-Periago, A; Rossignolo, G. M., The Synthesis and Conformation of Oxygenated Trianglimine Macrocycles. Org. Biomol. Chem. 2005, 3, 524-537.

Landers, J.; Gor, G. Y.; Neimark, A. V., Density functional theory methods for characterization of porous materials. Colloid Swface A 2013, 437, 3-32.

Le Bail, A.; Jouanneaux, A., A qualitative account for anisotropic broadening in whole•powder-diffraction-pattern fitting by second-rank tensors. J Appl Crystallogr 1997, 30 (3), 265-271.

Li, R. L.; Flanders, N. C.; Evans, A. M.; Ji, W.; Castano, I.; Chen, L. X.; Gianneschi, N. C.; Dichtel, W.R., Controlled growth of imine-linked two-dimensional covalent organic framework nanoparticles. Chem. Sci. 2019, JO (13), 3796-3801.

Li, X.; Gao, Q.; Aneesh, J.; Xu, H.-S.; Chen, Z.; Tang, W.; Liu, C.; Shi, X.; Adarsh, K.; Lu, Y., Molecular Engineering of Bandgaps in Covalent Organic Frameworks. Chem. A,fatter. 2018,30, 5743-5749.

Lohse, M. S.; Bein, T., Covalent organic frameworks: Structures, synthesis, and applications. Adv. Fune. Mater. 2018, 28 (33), 1705553.

Lustig, W. P.; Mukherjee, S.; Rudd, N. D.; Desai, A. V.; Li, J.; Ghosh, S. K., Metal-organic frameworks: functional luminescent and photonic materials for sensing applications. Chem. Soc. Rev. 2017, 46 (11), 3242-3285.

Lyle, S. J.; Waller, P. J.; Yaghi, 0. M., Covalent Organic Frameworks: Organic Chemistry Extended into Two and Three Dimensions. Trends in Chemistry 2019, 1, 172-184.

Martin, R. L., Natural Transition Orbitals. J Chem. Phys. 2003, 118, 4775-4777.

Miorandi, D.; Sicari, S.; De Pellegrini, F.; Chlamtac, I., Internet of things: Vision, applications and research challenges. Ad hoc Netw. 2012, JO (7), 1497-1516.

Nekoeinia, M.; Yousefinejad, S.; Abdollahi-Dezaki, A., Prediction ofE TN Polarity Scale of Ionic Liquids Using a QSPR Approach. Ind Eng. Chem. Res. 2015, 54 (50), 12682-12689.

Ning, G. H.; Chen, Z. X.; Gao, Q.; Tang, W.; Chen, Z. X.; Liu, C. B.; Tian, B. B.; Li, X.; Loh, K. P., Salicylideneanilines- Based Covalent Organic Frameworks as Chemoselective Molecular Sieves. J Am. Chem. Soc. 2017, 139 (26), 8897-8904.

Okada, Y.; Sugai, M.; Chiba, K., Hydrogen-Bonding-Induced Fluorescence: Wate ••Soluble and Polarity-Independent Solvatochromic Fluorophores. J Org. Chem. 2016, 81, 10922-10929.

Reichardt, C., Solvatochromic Dyes as Solvent Polarity Indicators. Chem Rev 1994, 94(8), 2319-2358.

Segura et al 'Covalent Organic Frameworks based on Schiff-base Chemistry Synthesis, Properties and Potential Applications' Chemical Society Reviews 2016. vol. 45(20).

Serre, C.; Bourrelly, S.; Vimont, A.; Ramsahye, N. A.; 1\faurin, G.; Llewellyn, P. L.; Daturi, M.; Filinchuk, Y.; Leynaud, O.; Barnes, P., An explanation for the very large breathing effect of a metal-organic framework during CO2 adsorption. Adv. Afater. 2007, 19 (17), 2246-2251.

Sing, K., The Use of Nitrogen Adsorption for the Characterization of Porous Materials: Review. Colloids and Surf, A 187, 188, 2001.

Smith, B. J.; Overholts, A. C.; Hwang, N.; Dichtel, W.R., Insight into the crystallization of amorphous imine-linked polymer networks to 2D covalent organic frameworks. Chem Commun 2016, 52 (18), 3690-3693.

Wei, Y. S.; Chen, K. J.; Liao, P. Q.; Zhu, B. Y.; Lin, R. B.; Zhou, H. L.; Wang, B. Y.; Xue, W.; Zhang, J. P.; Chen, X. M., Turning on the

(56) References Cited

OTHER PUBLICATIONS flexibility of isoreticular porous coordination frameworks for drastically tunable framework breathing and thermal expansion. Chem. Sci. 2013, 4 (4), 1539-1546.

Wikipedia 'Covalent Organic Framework' Jan. 4, 2018 (Jan. 4, 2018) retrieved from <https://en.wikipedia.org/w/index.php?title=Covalent_organic_framework&oldid=818589556>.

Waller, P. J.; Gándara, F.; Yaghi, O. M., Chemistry of covalent organic frameworks. Accounts of chemical research 2015, 48 (12), 3053-3063.

International Search Report and Written Opinion, corresponding to PCT/US20/49668, dated Nov. 30, 2020.

* cited by examiner

Fig. 4A
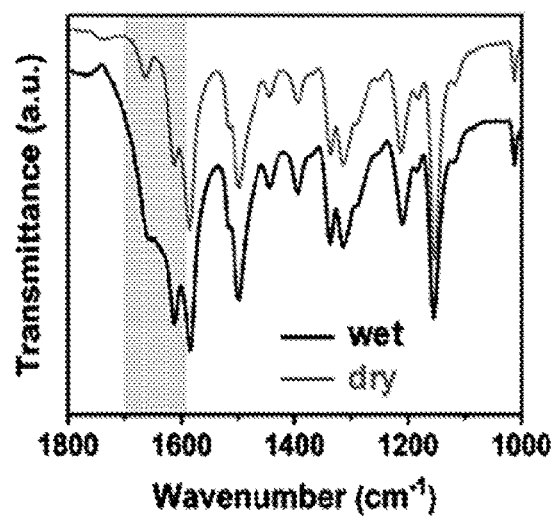
Fig. 4B
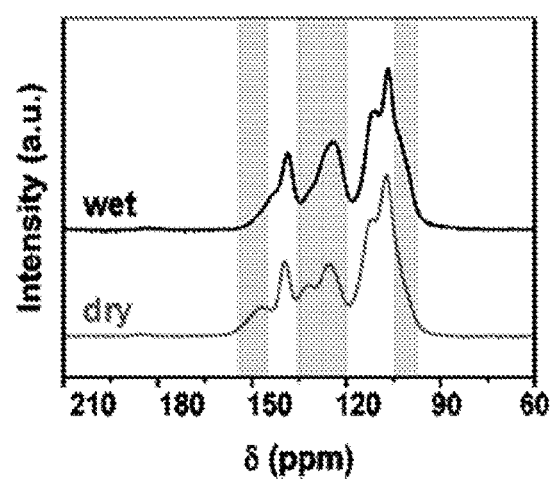
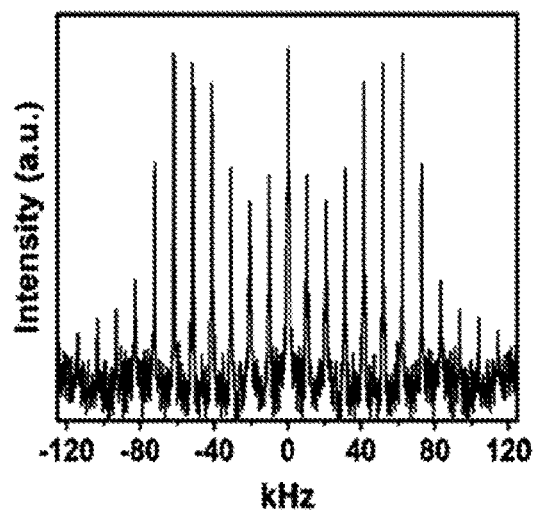
Fig. 4C
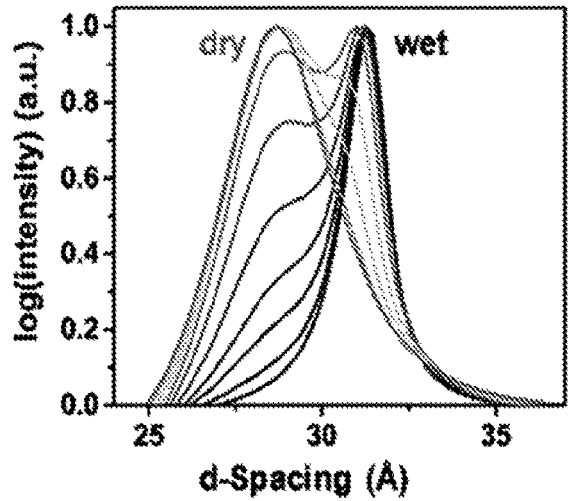
Fig. 4D

TAUTOMERIC SENSING USING A COVALENT ORGANIC FRAMEWORK

CROSS-REFERENCE TO RELATED APPLICATIONS

This application represents the United States National Stage of International Patent Application PCT/US2020/049668, filed Sep. 8, 2020, which claims benefit of priority to U.S. Provisional Patent Application 62/896,358, filed Sep. 5, 2019, the contents of each of which are incorporated herein by reference in their entirety.

STATEMENT REGARDING FEDERALLY FUNDED RESEARCH OR DEVELOPMENT

This invention was made with government support under W911NF-15-1-044 awarded by the United States Army Research Office. The government has certain rights in the invention.

BACKGROUND

Tautomers are constitutional isomers that are interconverted by migration of an atom or group of atoms. This chemical change is often rapid, and the relative stability of the tautomers can depend strongly on the surrounding environment, including the presence or absence of volatile species. Because tautomers often display rapid interconversion, sensitivity to different chemical stimuli, and switchable optical behavior, they have found extensive use as molecular probes.[1] However, solid state systems in which tautomers have distinct properties and sensitivity to relevant environmental changes are much less common. Moreover, the extent of this property change is correlated to the accessibility of tautomeric sites to analytes, which presents a challenge that, to date, has limited solid-state sensing based upon tautomerization.

BRIEF SUMMARY OF THE INVENTION

Disclosed herein are covalent organic frameworks (COFs) having tautomerically active subunits (TAS). A first aspect of the invention is a sensor comprising a COF, the COF comprising the TAS capable of reversible iminol-to-ketoenamine tautomerism between a first tautomer and a second tautomer and a linking group. The first tautomer has a first detectable characteristic and the second tautomer has a second detectable characteristic. The first and second detectable characteristics are detectably distinct from each other. Suitably, the sensor may further comprise an electromagnetic radiation source, a detector, a regeneration agent, a heating element, or any combination thereof.

Another aspect of the invention is a method for detecting the presence of an analyte. The method may comprise detecting a first detectable characteristic or a second detectable characteristic of any of the COFs described herein. The method may further comprise regenerating the COF prior to or subsequent to detection of any detectable characteristic.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 1A shows imine condensation between aniline and o-hydroxybenzaldehyde leads to an iminol that can tautomerize via single proton transfer to generate a cis-ketoenamine. FIG. 1B shows imine condensation between TAPB and TFP leads to an iminol product that rapidly and irreversibly converts to its β-ketoenamine tautomer. FIG. 1C shows imine formation between TAPB and 2,5-dihydroxyterephthaldehyde leads to an iminol product (TAPB-PDA-OH COF) that can only tautomerize to a 'single cis-ketoenamine' and leads to a dynamic equilibrium of the diiminol and iminol/cis-ketoenamine forms. FIG. 1D shows imine condensation between TAPB and terepthaldehyde or 2,5-dibutoxyterephthaldehyde leads to formation of TAPB-PDA or TAPB-PDA-OBu COF, respectively, where the tautomerization is not possible. FIG. 1E shows an exemplary sensor.

FIG. 2A shows synthesis and chemical structures of the TAPB-PDA-OH, TAPB-PDA, and TAPB-PDA-OBu COFs. The shaded surface shows the high surface area and accessibility of tautomeric sites for the TAPB-PDA-OH COF. FIGS. 2B, 2D, and 2F show experimental and predicted eclipsed stacking PXRDs of TAPB-PDA-OH COF (FIG. 2B), TAPB-PDA COF (FIG. 2D) and TAPB-PDA-OBu COF (FIG. 2F). FIGS. 2C, 2E, and 2G show $N_2$ adsorption-desorption isotherms of TAPB-PDA-OH COF (FIG. 2C), TAPB-PDA COF (FIG. 2E) and TAPB-PDA-OBu COF (FIG. 2G). FIGS. 2H-2J show pore size distributions for TAPB-PDA-OH COF (FIG. 2H), TAPB-PDA COF (FIG. 2I) and TAPB-PDA-OBu COF (FIG. 2J).

FIG. 3A shows diffuse reflectance spectroscopy (DRS) plots for TAPB-PDA-OH COF powder in different solvents; photographs of the dry and wet COFs are shown to the right. FIG. 3B shows plot of change of absorption strength (measured by the Kublka-Munk function) at 600 nm versus ETN parameter: the near-linear trend is broken for strongly H-bonding solvents. FIG. 3C shows calculated UV-Vis spectra of the tautomeric model compounds (iminol (gas) 1, iminol (water) 2, and single cis-ketoenamine 3) in the gas phase and in the presence of water. The hole and electron natural transition orbitals for the low-energy transition of the single cis-ketoenamine form (with two molecules of water present) are shown to the right. D Plot of change of absorbance at 600 nm versus $pK_a$ for H-bonding solvents. FIG. 3E shows a diffuse reflectance spectra (DRS) of TAPB-PDA COF when dry 11 and wetted 12. FIG. 3F shows a DRS spectra of TAPB-PDA-OBu COF when dry 21 and wetted 22.

FIG. 3G shows a FT-IR spectra of the amorphous and crystalline structures. FIG. 3H shows a PXRD pattern showing little crystalline diffraction with a large amorphous hump at 10-30°. FIG. 3I shows a Sorption isotherm showing little adsorption in the microporous region, and the corresponding BET surface area is ca. 45 $m^2\ g^{-1}$. The pore size distribution that is very broad. FIG. 3J shows a DRS of the dry and wet solid. FIG. 3K shows a photograph of the dry and wet samples of the amorphous and crystalline materials, showing the more pronounced response of the crystalline material.

FIGS. 4A-4E. FIG. 4A shows a FT-IR shows appearance of a new peak around 1650 $cm^{-1}$ in wet conditions. FIG. 4B shows a CP-MAS $^{13}C$ NMR shows diminution of the imine peak at 160 ppm and appearance of a sp² C peak at 110 ppm. Synchrotron X-ray scattering pattern of the wetted TAPB-PDA-OH COF as it dries. FIG. 4C shows a MAS ²H NMR of the D₂O-exchanged and subsequently dried TAPB-PDA-OH COF indicating deuterium incorporation in a rigid environment. FIG. 4D shows a (100) diffraction feature shifted to a real space d-spacing. FIG. 4E shows chemical structures of the different tautomers of small-molecule model compound with DFT relative energies in the presence of water are shown on the right.

FIG. 5A shows FT-IR showing no damage to chemical linkages during the wetting process. FIG. 5B shows sorption isotherms are similar showing no deleterious effects in the pore structures due to wetting with water. FIG. 5C shows PXRDs showing wetting the COF does not affect the crystalline diffraction.

FIG. 6A shows AFM images of the TAPB-PDA-OH COF film. FIG. 6B shows GIWAXS of the as-synthesized TAPB-PDA-OH COF films. FIG. 6C shows humidity sensing using TAPB-PDA-OH COF films using the change in absorbance at 600 nm; TAPB-PDA COF films shows no response to humidity. FIG. 6D shows humidity sensing using TAPB-PDA-OH films over multiple cycles. The break shows a gap of more than one month of usage. The similar response observed after one month attests to its stability. FIG. 6E shows humidity sensing using thin films of TAPB-PDA-OBu COF thin films at 560 nm. FIG. 6F shows humidity sensing performed using TAPB-PDA-OH COF thin films at different wavelengths indicating wavelength-independent response.

DETAILED DESCRIPTION OF THE INVENTION

Disclosed herein are covalent organic frameworks (COFs) having tautomerically active subunits (TAS). Use of TASs allow for the manufacture of COF sensors capable of rapid response to analytes, such as changes in relative humidity. Because the COF sensor reversibly responds to analytes, passive or active regeneration of the sensor is possible. This allows for repeated use of the sensor. Moreover, the COF sensors described herein are stable for months or longer, allowing them to be suitable for a number of different sensing applications.

As used herein, a "covalent organic framework" or "COF" is a two- or three-dimension organic solid with extended, periodic, and porous structures in which a plurality of linking groups (LGs) and TASs are linked by covalent bonds. Suitably, COFs may be made entirely from light elements (e.g., H, B, C, N, and O). Two-dimensional COFs can assemble functional aromatic systems into cofacially-stacked morphologies ideal for transporting excitons or charge carriers through the material. COFs are permanently porous and structurally precise polymer networks[2-7].

Here we describe an approach to enhance the magnitude of the optical shift in a COF structure by incorporation of tautomerically active subunits. In contrast to solvatochromism, which relies on stabilization of a single chromophore, tautomerism allows for a new chromophore to be generated upon exposure to analytes. This allows for one tautomer conformation to have a detectable characteristic detectably distinct from another tautomer conformation. As the Examples demonstrate, humidity-induced tautomerization results in a color change that is colorimetrically detectable and easily visible by the naked eye.

Figure 1A:
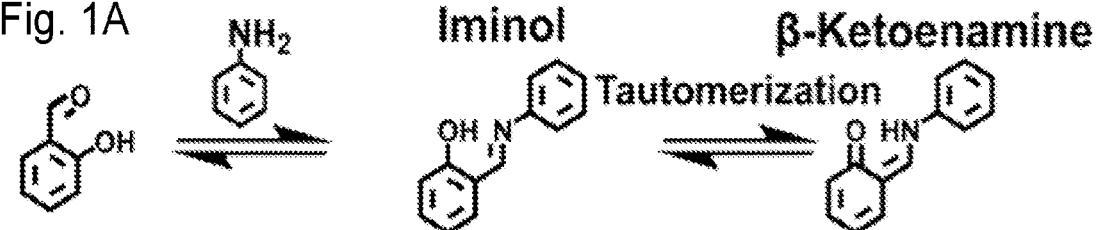
FIGS. 1A-1E.
Figure 1B:
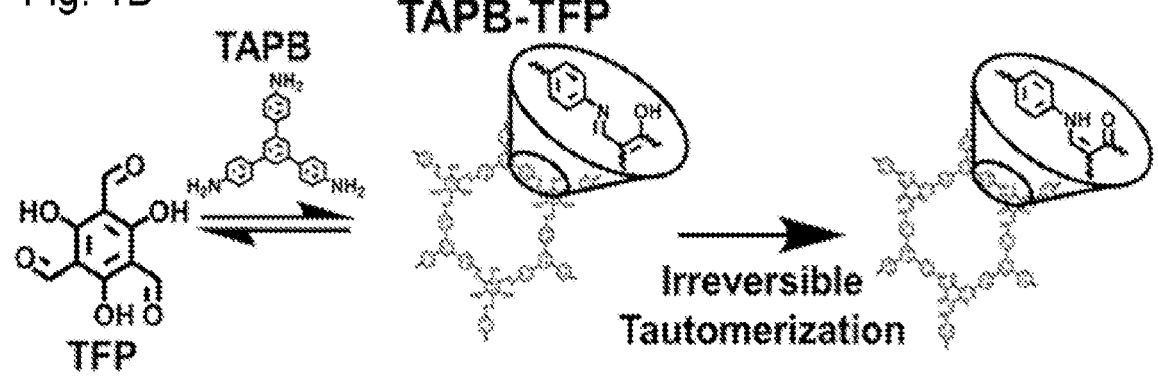
Figure 1C:
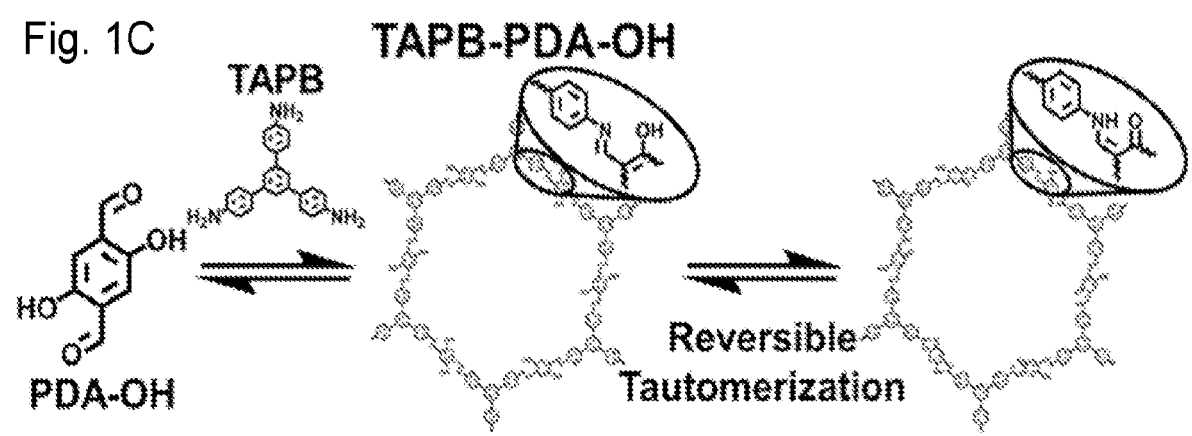

Iminol-to-ketoenamine tautomerism (FIG. 1A) is known in COF materials. In particular, iminol groups are formed when COFs made from 2,4,6-triformylphloroglucinol (TFP), but irreversibly tautomerize during the polymerization to yield a β-ketoenamine-linked COF (FIG. 1B).[8-11] The stability of the β-ketoenamine tautomer precludes using TFP for tautomeric sensing.[12] Bis-ketoenamine species, in contrast, may exhibit dynamic tautomerization because the bis-ketoenamine species, for which a closed-shell non-zwitterionic resonance structure cannot be drawn, is energetically disfavored after the first ketoenamine formation. As a result, TAS, such as 2,5-dihydroxyterephthaldehyde (PDA-OH), are capable of preparing materials that allow for a new chromophore to be generated upon exposure to an analytes (FIG. 1C).

For optical or visual detection, the complementary linking group (LG) used to form a COF should ideally be weakly absorbing in the visible region in order to not mask the tautomerically induced change of color upon exposure of the COF to analyte. This consideration makes the UV-absorbing 1,3,5-tris(4-aminophenyl)benzene (TAPB) an suitable condensation partner.

Figure 1D:
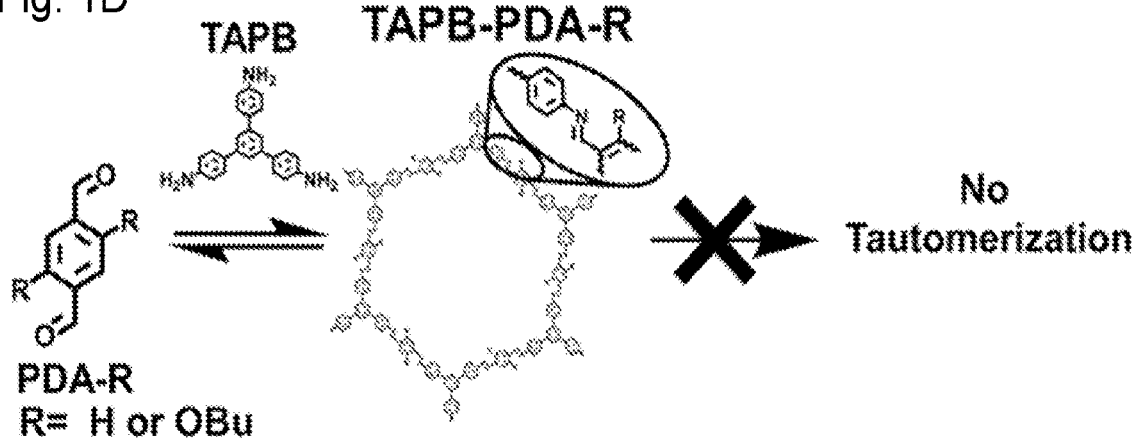

In the Examples that follow, the sensing behavior of TAPB-PDA-OH COF[13] was compared to structural analogues of this material using dibutoxyterephthaldehyde (PDA-OBu) and terepthaldehyde (PDA),[14] which cannot undergo iminol-to-ketoenamine tautomerism (FIG. 1D). Using these materials, we experimentally explored the solvent-induced tautomeric behavior associated with the TAPB-PDA-OH COF, theoretically modeled the optical behavior of the tautomers, and gained insight into their dynamic equilibrium. We then fabricated a TAPB-PDA-OH COF sensor that rapidly responds to changes in relative humidity and is stable for months or longer.

COFs can be layered sheets of 2D COFs that typically adopt nearly eclipsed stacked structures, providing continuous nanometer-scale channels normal to the stacking direction, as well as significant π-orbital overlap between monomers in adjacent layers. These features can provide an accessible high surface area interface for double-layer formation and pathways for charge transfer to/from, for example, redox-active groups that comprise the walls.

COFs are crystalline. For example, the COFs can form crystallites (i.e., discrete structures) where the longest dimension of the crystallites can be from 50 nm to 10 microns, including all values to the nanometer and ranges of nanometers therebetween. In various embodiments, the COF comprises at least 2 unit cells, at least 5 unit cells, at least 10 unit cells, at least 20 unit cells, at least 50 unit cells, at least 100 unit cells, at least 1000 unit cells, or at least 10,000 unit cells. The COFs may be present as a thin film (e.g., a film having a thickness of 10 nm to 10 microns, 10 nm to 1 micron, or 10 nm to 500 nm, including all values and ranges therebetween).

COF have a porous (e.g., microporous (pores with a longest dimension of less than 2 nm) or mesoporous structure (pores with a longest dimension of 2 nm to 50 nm). The porous structure forms a repeating pattern (i.e., not a random distribution of pores). In an embodiment, the framework has pores, where the pores run parallel to the stacked aromatic moieties. In an embodiment, the pores have a longest dimension (e.g., a diameter) of from 2 nm to 6 nm, including all values to the 0.05 nm and ranges to the 0.1 nm therebetween. In one example, the pores are 2.3 nm in diameter.

COFs can have high surface area. For example, COFs can have a surface area 500 $m^2/g$ to 6000 $m^2/g$, including all values to the $m^2/g$ and ranges of surface area therebetween. The surface area of the COFs can be determined by methods known in the art, for example, by BET analysis of gas (e.g., nitrogen) adsorption isotherms.

A "tautomerically active subunit" or "TAS" comprises a functionalized molecular subunit having two or more functional termini that can be covalently bonded to an equal number of different linker groups (LGs) that may be used to prepare COFs capable of reversible iminol-to-ketoenamine tautomerization. Suitably, the TAS is a dihydroxydialdehyde capable of forming iminol-to-ketoenamine tautomers when reacted with LGs having amine functional termini. The linkages between the TAS and LG provide robust materials with precise and predictable control over composition, topology, and porosity. The relative geometries of the functional termini in the starting materials determine the COFs topology, which does not change significantly as other functional groups are varied.

In some embodiments, the TAS comprises an aryl TAS. The term "aryl" is art-recognized and refers to an aromatic group. Representative aryl groups include phenyl, naphthyl, anthracenyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —CO$_2$alkyl, carbonyl, carboxyl, alkylthio, sulfonyl, sulfonamido, sulfonamide, ketone, aldehyde, ester, heterocyclyl, aryl or heteroaryl moieties, silyl moieties, or the like. In certain embodiments, the aromatic ring is substituted at one or more ring positions with an amine-terminated substituent or azide-terminated substituents, which may be useful in preparing the amine substituted COF. In certain other embodiments, the aromatic ring is not substituted, i.e., it is unsubstituted. In certain embodiments, the aryl group is a 6-10 membered ring structure.

Suitably, the TAS is a dihydroxydialdehyde aryl TAS such as a substituted or unsubstituted 2,5 dihydroxyterephthaldehyde (PDA-OH). The TAS may be substituted with a linear or branched alkyl, a liner or branched alkenyl, a linear or branched silyl, a cyclic alkyl, an aryl, or a heteroaryl.

A "linking group" or "LG" comprises a molecular subunit having two or more functional termini that can be covalently bonded to an equal number of TAS and that cannot be interchanged with a TAS. At least three TAS are each connected to a LG by covalent bond(s) or at least three LGs are each connected to a TAS by covalent bond(s). For example, a TAS and a LG may be connected by at least one covalent bond. In other examples, the TAS and LG are connected by one covalent bond, two covalent bonds, or three covalent bonds. The TAS and LG can be connected by a carbon-nitrogen imine bond or its tautomeric isomer.

LGs may be selected to prepare a COF having a desired geometry and/or porosity. Exemplary LGs may be selected to allow for the formation of COFs having 2-D or 3-D arrangements. LGs suitable for formation of 2-D COFs include, without limitation, LGs having trigonal planar, tetragonal planar, or hexagonal planar geometries. LGs suitable for formation of 3-D COFs include, without limitation, LGs having tetrahedral or octahedral geometries. Suitably, the COFs may comprise LGs having trigonal planar geometries such as 1,3,5-trisphenyl benzene LGS, such as 1,3,5-tris(aminophenyl)benzene (TAPB).

The COF may comprise a plurality of hexagonal pores. Such pores may be formed from the condensation of TAPB LGs and PDA-OH TAS, which may be optionally substituted. In some embodiments, the COF may comprise pores of different geometries than the hexagonal pores, e.g., trigonal, tetragonal, rhombic, or star-shaped pores.

Sensors for detectably identifying the presence of an analyte may be prepared from any of the COFs described herein. One tautomer conformation may have a first detectable characteristic and another tautomer conformation will have a second, detectably distinct characteristic. Suitably, the detectably distinct characteristic will be a coloring or spectroscopic feature, such as a charge transfer transition, associated with one tautomer conformation but not the other.

A detectably distinct coloring allows for colorimetric detection or visual detection with a naked eye or camera while a detectably distinct spectroscopic feature allows for spectroscopic detection. Suitably the spectroscopic detection technique is absorption or transmission spectroscopy as described in the Examples. The absorption or emission can be suitably detected with a spectrometer, e.g., a UV-Vis spectrometer. Other spectroscopic detection techniques, e.g., IR, Raman, fluorescence, may also be utilized to detect the detectable characteristic. The choice of radiation sources and detectors may be suitably selected depending on the spectroscopic technique and the spectroscopic feature to be detected.

Figure 1E:
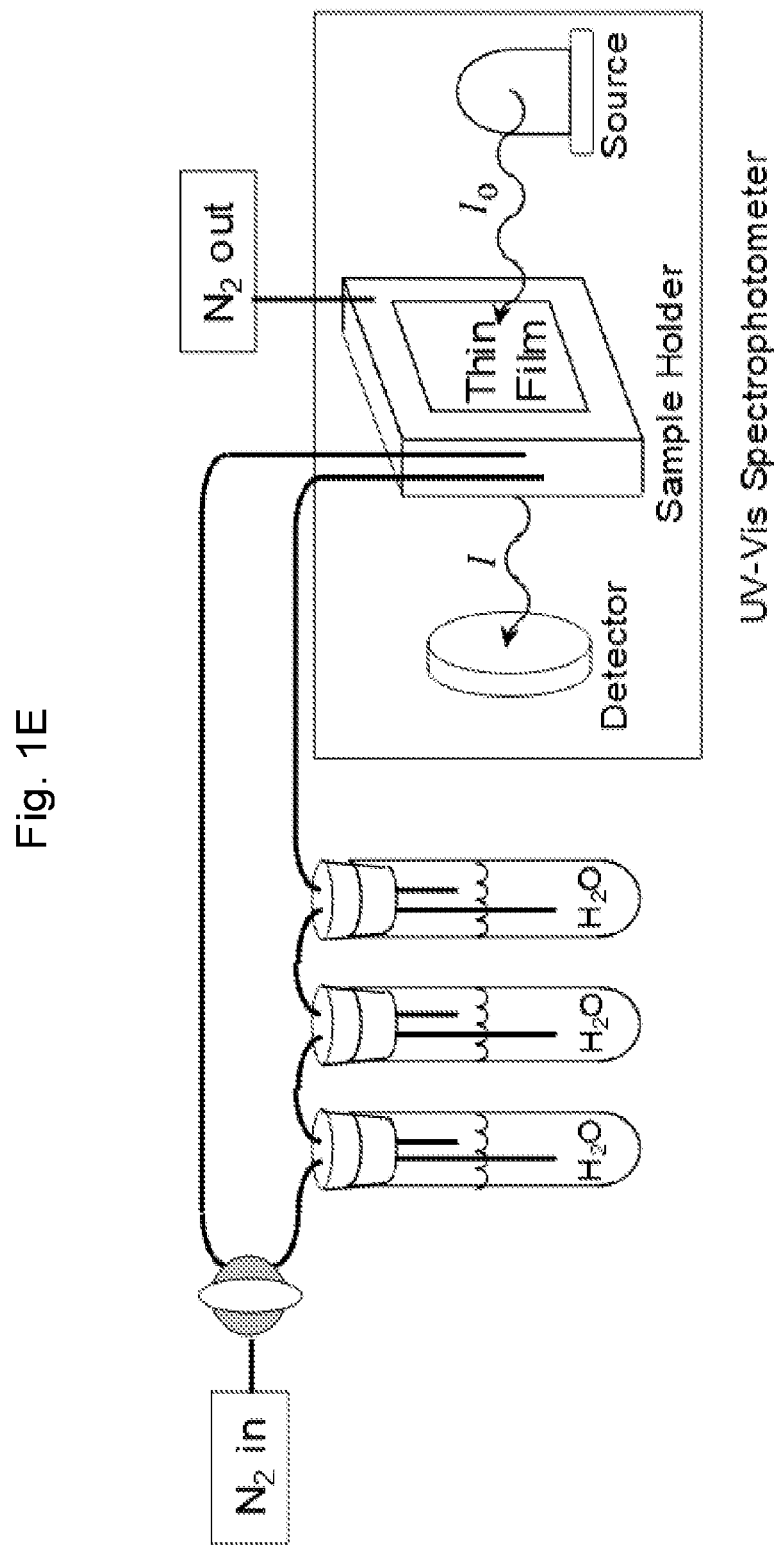

An exemplary sensor is provided in FIG. 1E. The sensors may comprise an electromagnetic radiation source, a detector, or regeneration agent, or any combination thereof. The radiation source may be any source suitably capable of irradiating the COF with a wavelength. Suitably the source may be a broadband source, e.g., a bulb or filament, or a narrow band wavelength source, e.g., a diode or a laser. The detector may be any detector suitably capable of detecting a detectable characteristic. Exemplary detectors include, without limitation photodetectors, cameras, or the like.

The sensors described herein are capable of detecting a variety of different analytes, such as analytes of low or moderate polarity, hydrogen-bonding (H-bonding) analytes, or ionic analytes. Exemplary analytes include, without limitation, water, toxins, explosives, metals, and volatile gases. The intensity of the detectable characteristic may depend on the interaction strength of the analyte and the COF. In some embodiments, the strength of absorption may be positively correlated with the solvent H bonding and polarity parameter, $E_T^N$. In some embodiments, the strength of absorption may be negatively correlated with pKa. The analyte may have an $E_T^N$ greater than 0.7 and/or a pKa less than 15.5. Water is an exemplary analyte, which has an $E_T^N$ greater than 0.7 and a pKa less than 15.5.

The sensor may suitably employ a regeneration agent. A regeneration agent is suitably any chemical or physical agent capable of reversing the effect of an analyte on the COF. When the presence of the analyte results in a higher equilibrium concentration of one tautomer conformation over another, the regeneration agent suitably lowers the equilibrium concentration. The regeneration agent may be a nonpolar compound, such as $N_2$.

The sensor may also be passively regenerated without the need for a regeneration agent. The sensor may optionally comprise a heating element for accelerating regeneration.

Methods for detecting the presence of an analyte are also provided for. The method may comprise detecting a detectable characteristic of any of the COFs described herein. Suitably the detection method with be capable of distinguishing between detectable characteristics associated between different tautomer conformations. Suitably the detection method may be colorimetric or by irradiation the COF with electromagnetic radiation and measuring a spectroscopic feature, such as a charge transfer transition.

The present disclosure is not limited to the specific details of construction, arrangement of components, or method steps set forth herein. The compositions and methods disclosed herein are capable of being made, practiced, used, carried out, and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like. All percentages referring to amounts are by weight unless indicated otherwise.

No admission is made that any reference, including any non-patent or patent document cited in this specification, constitutes prior art. In particular, it will be understood that, unless otherwise stated, reference to any document herein does not constitute an admission that any of these documents form part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The following examples are meant only to be illustrative and are not meant as limitations on the scope of the invention or of the appended claims.

Examples

I. Results and Discussion

Figure 2A:
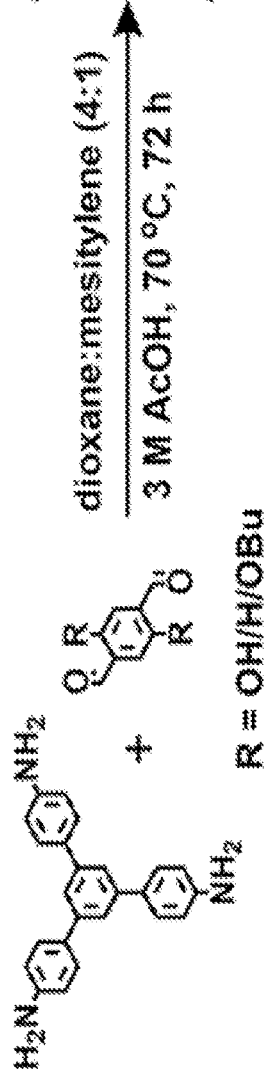
FIGS. 2A-2J.
Figure 2B:
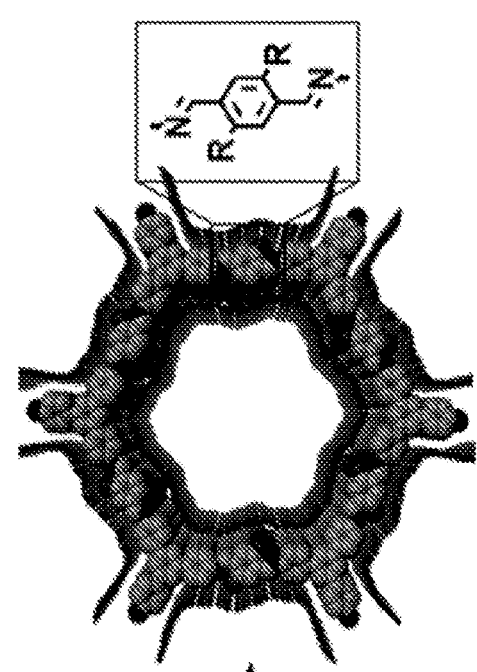
Figure 2B:
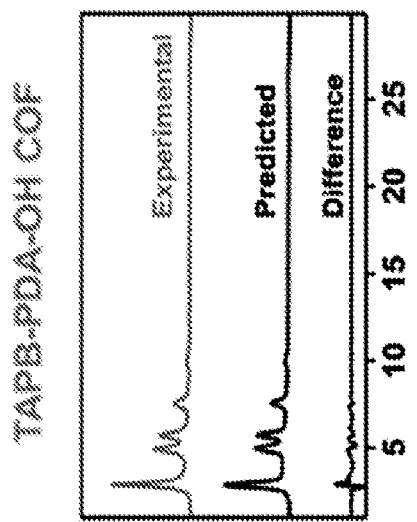
Figure 2D:
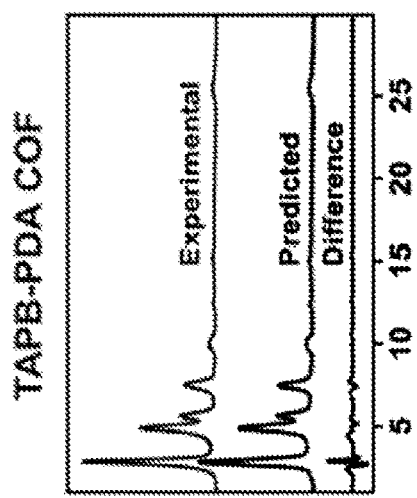
Figure 2F:
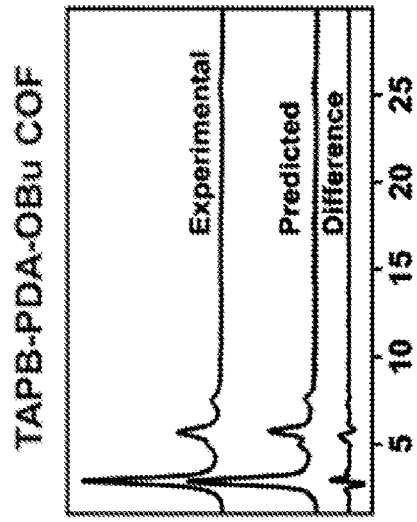
Figure 2C:
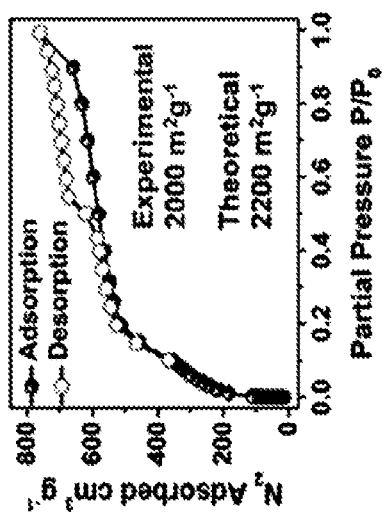
Figure 2E:
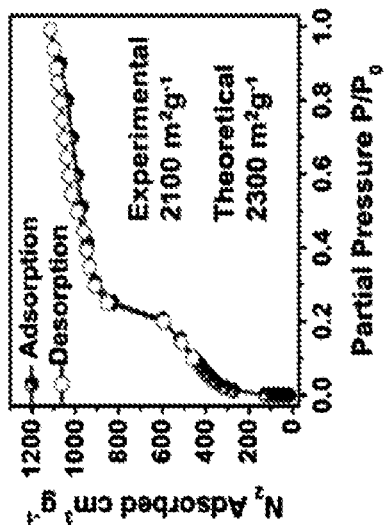
Figure 2G:
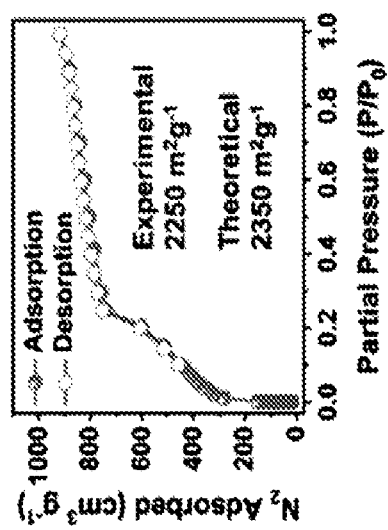
Figure 2H:
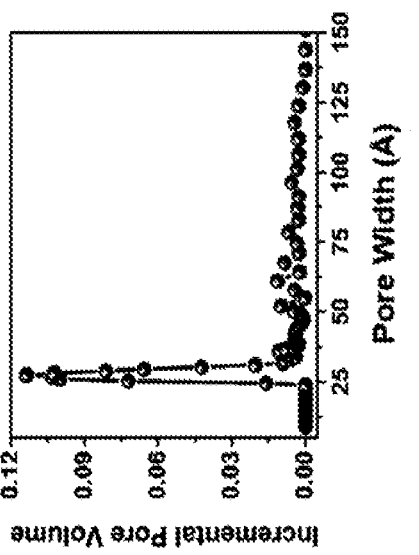
Figure 2I:
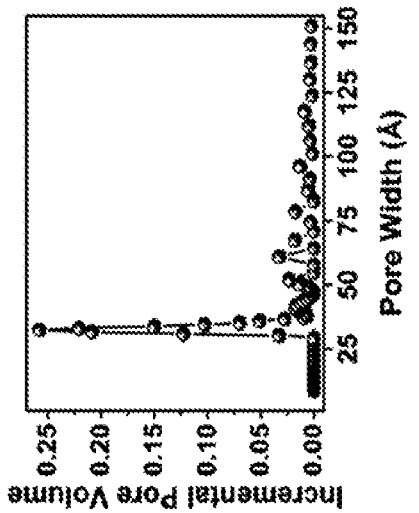
Figure 2J:
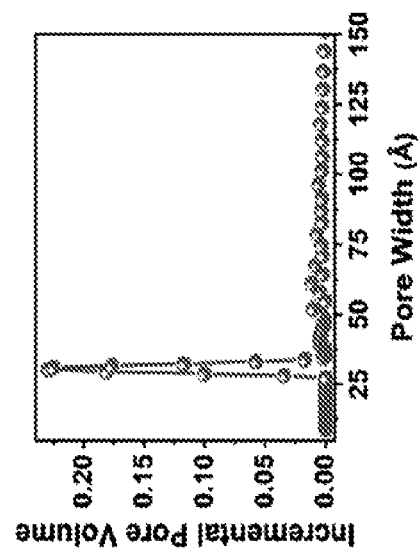

Synthesis and characterization of COF Materials. COFs were synthesized as powders by adapting reported solvothermal methods.[15] (FIG. 2A) Fourier-transform infrared (FT-IR) spectroscopy confirmed the imine condensation by the disappearance of the aldehyde (1660-1680 $cm^{-1}$) and amine (3300-3450 $cm^{-1}$) stretching modes and a concomitant increase in the intensity of the C=N stretching modes at 1610-1620 $cm^{-1}$. The disappearances of aldehyde and amine peak and appearances of imine peak indicates successful imine condensation. These features suggest that the dry COF powders contain predominantly iminol linkages, rather than ketoenamine moieties. Powder X-ray diffraction (PXRD) confirmed the structural regularity and high quality of the COFs, indicating the appearance of several diffraction features that can be indexed as the (100), (110), (200), and (210) Bragg reflections of a hexagonal lattice (FIG. 2B, 2D, 2F), while a weak peak at higher angle can be assigned to a (001) reflection. By comparison to simulated powder diffraction patterns we infer that all COFs are hexagonally tessellated sheets that eclipse one another with ca. 3 Å interlayer separations. Furthermore, Le Bail fitting of the PXRD pattern indicated that all COFs have an approximate in-plane domain size of ~100 nm.[16] Nitrogen sorption isotherms were collected for these materials, all of which displayed hysteresis-free type IV isotherms indicative of well-ordered mesopores that are filled as monolayers initially, but are subject to capillary condensation as they form multilayers.[17] Brunauer-Emmett-Teller (BET) analysis revealed that the TAPB-PDA, TAPB-PDA-OH and TAPB-PDA-OBu COFs had surface areas of 2100, 2250 and 2000 $m^2$ $g^{-1}$, respectively (FIGS. 2C, 2E, 2G), near their respective Connolly surface areas of 2300, 2350 and 2200 $m^2$ $g^{-1}$.[18] The pore-size distribution derived from nonlocal density functional theory show a narrow distribution of pore sizes for all materials with average pore size (30 Å) consistent with the modeled eclipsed structures (FIG. 2H-2J).[19] Using a Monte-Carlo algorithm with water as a probe molecule, we calculated that ca. 10 water molecules per iminol moiety can fit within the TAPB-PDA-OH COF pores. This finding suggests that this material will be amenable to accepting solvent vapor into its pores. Furthermore, the experimentally determined pore sizes and high surface areas of these materials indicates that analytes can rapidly access the tautomerically active sites.

Figure 3A:
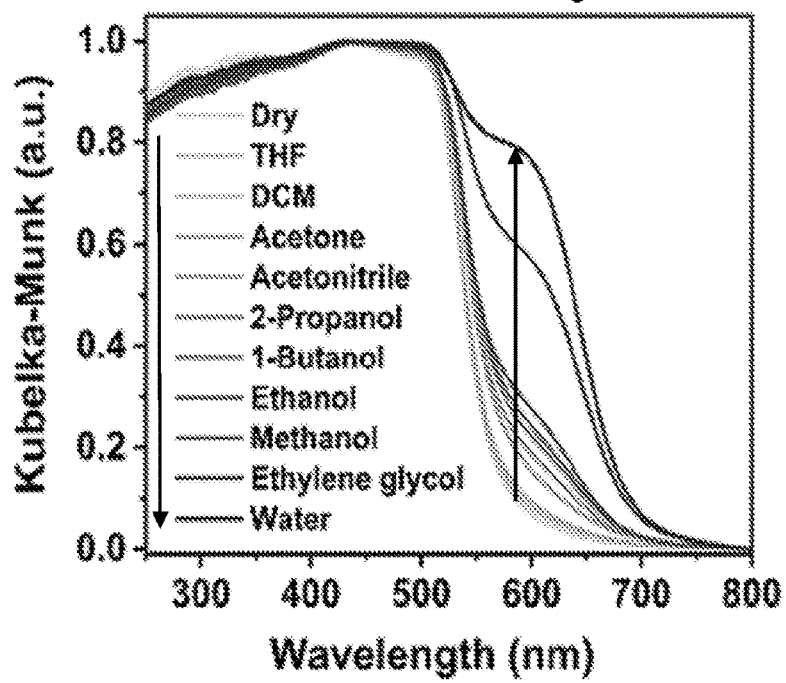
FIGS. 3A-3F.
Figure 3A:
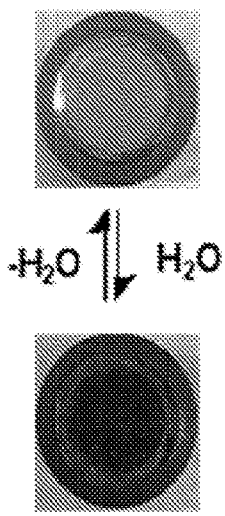

Tautomerism-Mediated Chromic Behavior. The TAPB-PDA-OH COF changes color when its dry form is solvated (FIG. 3A). Diffuse reflectance spectroscopy (DRS) showed that the orange COF has an absorption onset of 572 nm (2.2 eV). A new band with an onset at approximately 690 nm (1.8 eV) emerges when the COF is soaked in solvents of increasing polarity. This difference is particularly pronounced when TAPB-PDA-OH COF is exposed to $H_2O$, which results in a dark coloration and absorption spanning the entire visible region (FIG. 3A).

Figure 3C:
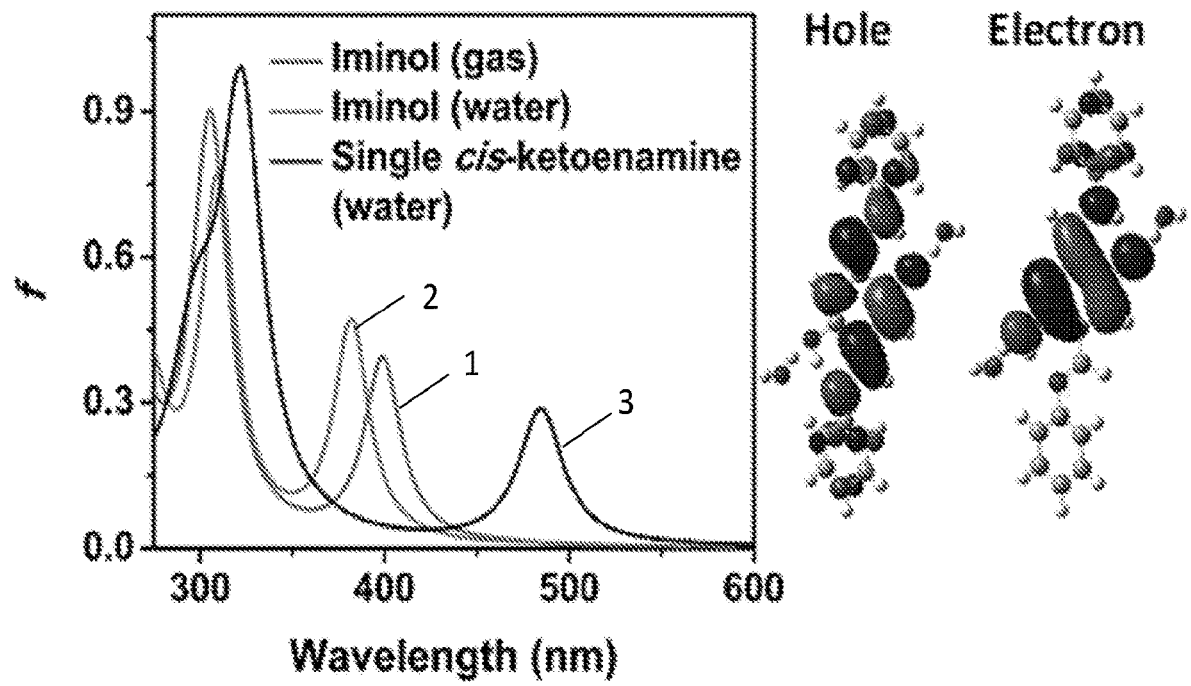
Figure 3C:
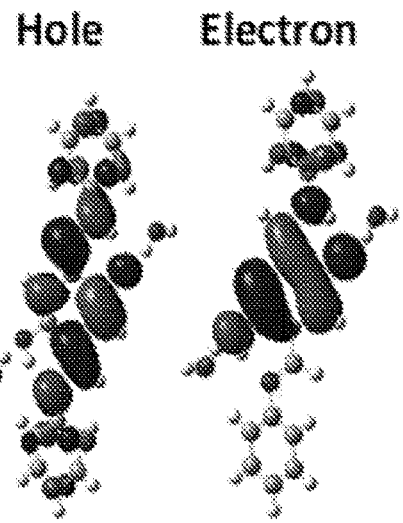
Figure 3B:
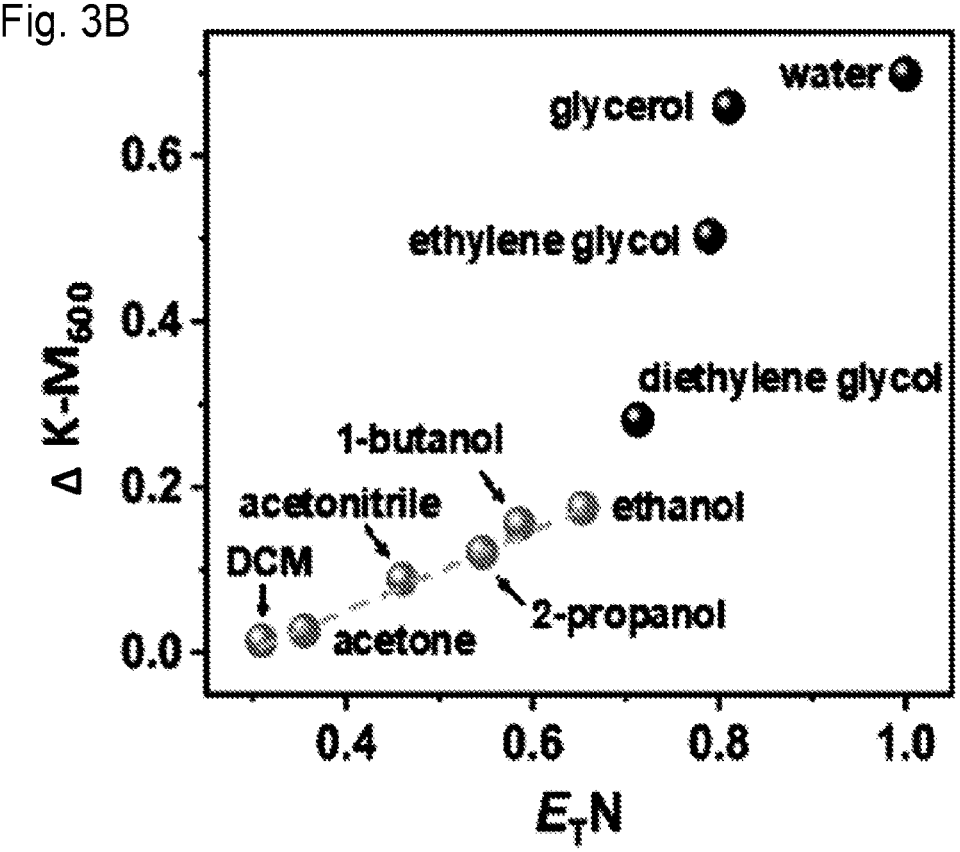

For solvents of low to moderate polarity such as tetrahydrofuran (THF), dichloromethane (DCM), acetone, acetonitrile, 2-propanol, 1-butanol and ethanol, the increase in the strength of absorption at 600 nm (as measured by the increase in the Kubleka-Munk function at that wavelength, $\Delta K\text{-}M_{600}$) relative to the that of the dry COF is approximately linear with the solvent H-bonding and polarity parameter, ETN (FIG. 3B).[20] This behavior in weakly H-bonding solvents may be attributable to either charge stabilization of the excited state of the iminol species (solvatochromism) or due to formation of a new chromophore. In previous reports, COF solvatochromism has been shown to display a red-shift of the absorption edge rather than the new distinct peak we observe for the TAPB-PDA-OH COF. In this case, there is a marked deviation from linearity in the dependence of $\Delta K\text{-}M_{600}$ on ETN for solvents of $E_TN>0.7$ (FIG. 3B), suggesting more complex behavior than simple solvatochromism, while, the emergence of a new distinct absorption feature at 600 nm in more strongly H-bonding solvents, and most prominently in water, is consistent with the formation of a new chromophore in increasing quantities. We assign this feature to the formation of the cis-iminol/ketoenamine tautomer via a single proton transfer (SPT) mediated tautomerism. Time-dependent density-functional theory (TD-DFT) calculations on a model 1,4-diiminol compound also indicate that the spectrum of this tautomer is only weakly dependent on the presence of water (FIG. 3C),[21] whereas that of the single iminol/cis-ketoenamine tautomer of the model diiminol is calculated to have a much longer absorption wavelength (FIG. 3C) than the iminol, further supporting the hypothesis that this tautomer is responsible for the color of the hydrated TAPB-PDA-OH COF. The natural transition orbitals indicate that this transition is associated with charge transfer from the enamine and imine arms to the central aromatic ring (FIG. 3C).

Figure 3D:
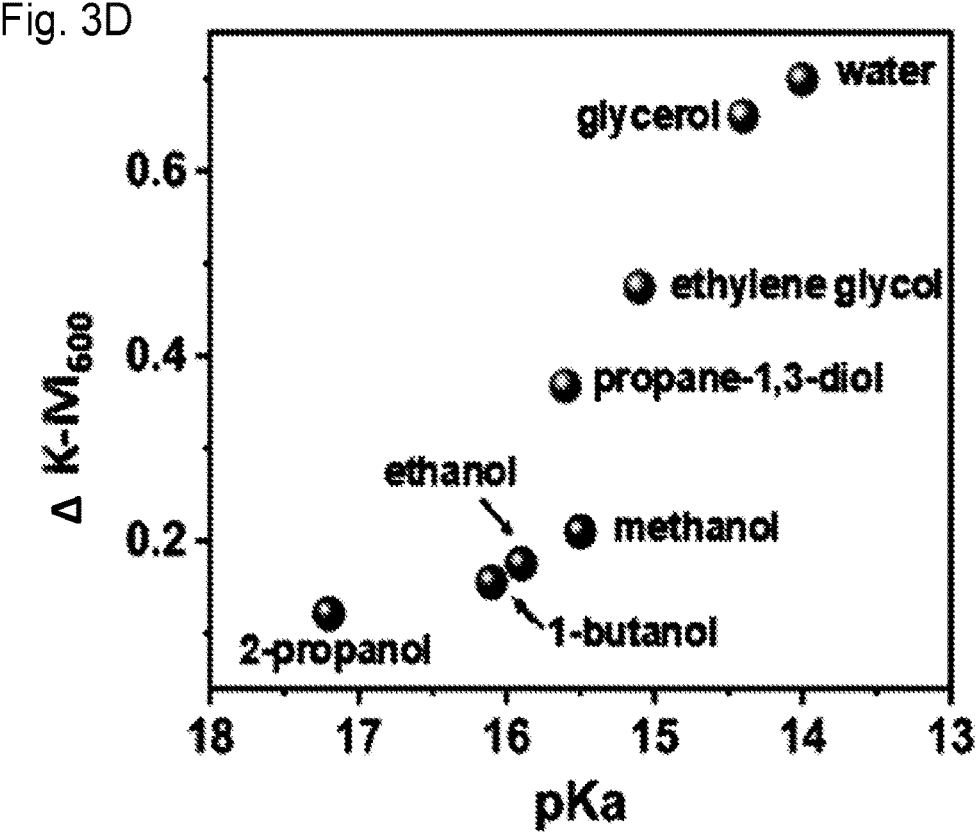
Figure 3E:
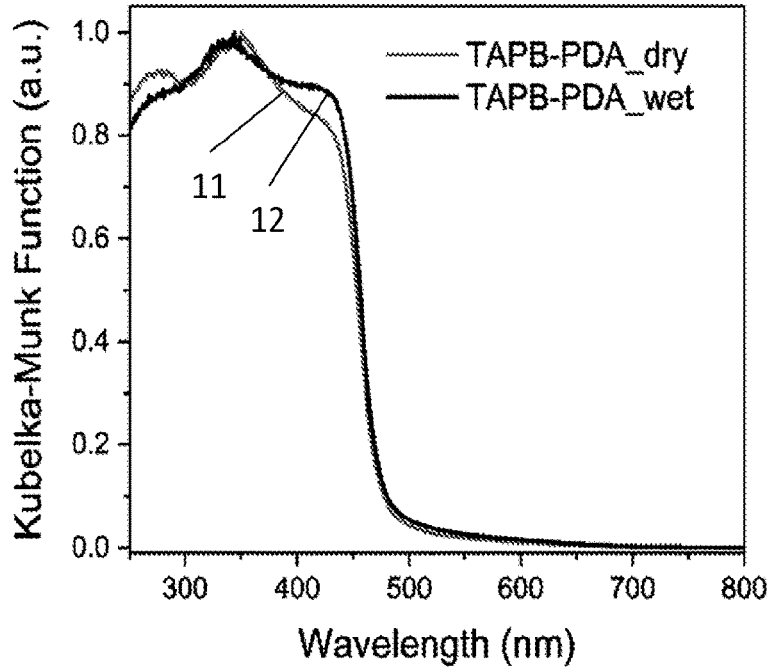
Figure 3E:
Figure 3F:
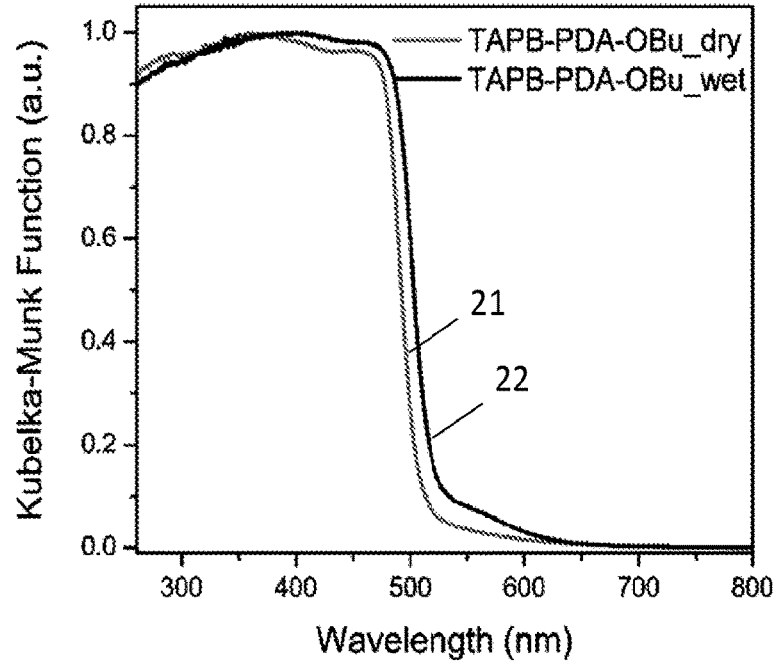
Figure 3F:
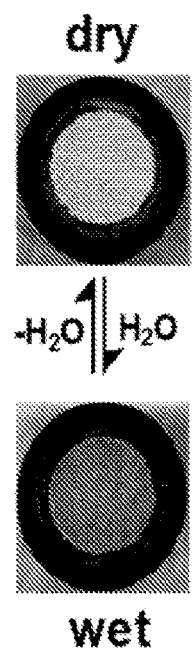
Figure 3H:
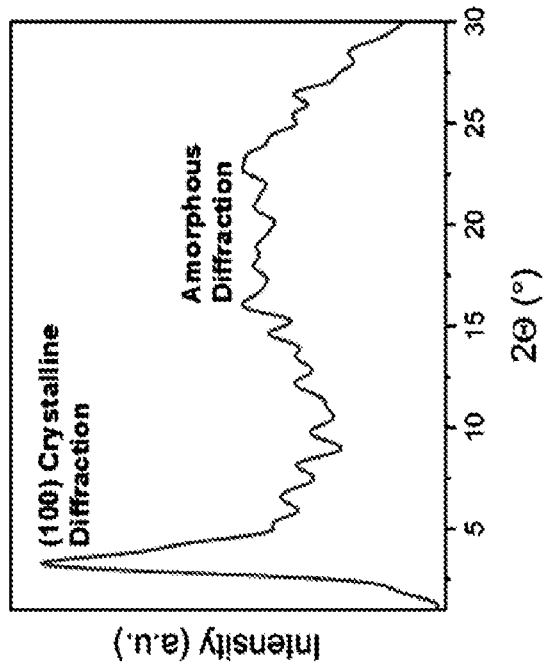
FIGS. 3G-3K. Structure, characterization and optical data of the amorphous TAPB-PDA-OH solid.
Figure 3G:
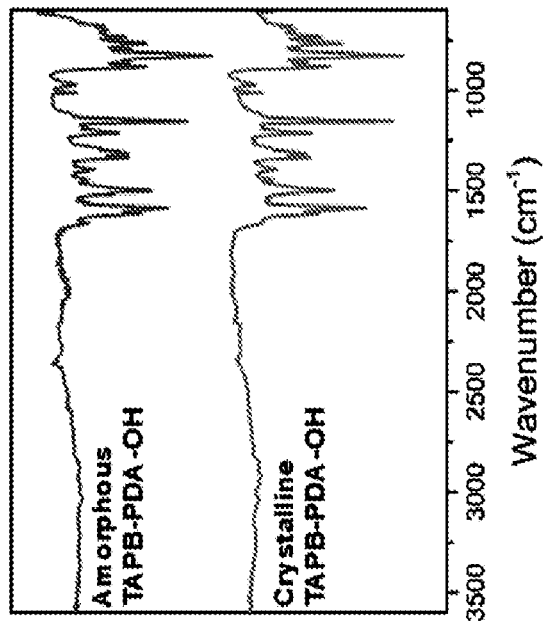
Figure 3J:
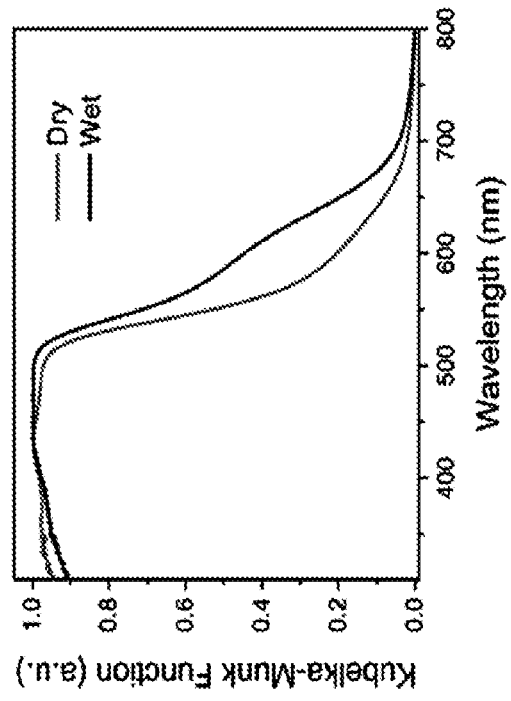
Figure 3I:
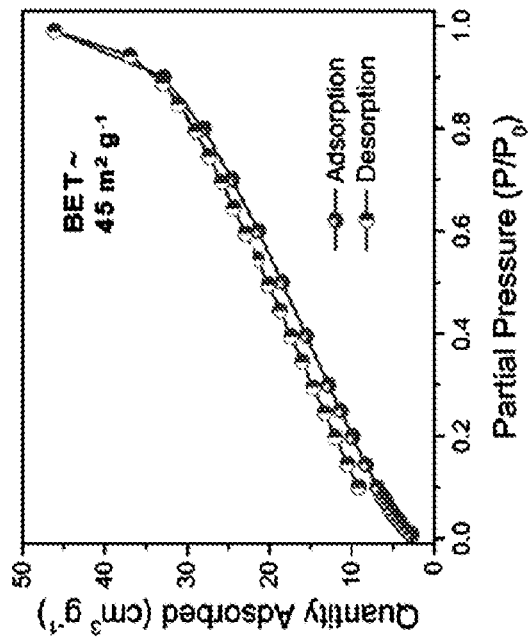
Figure 3K:
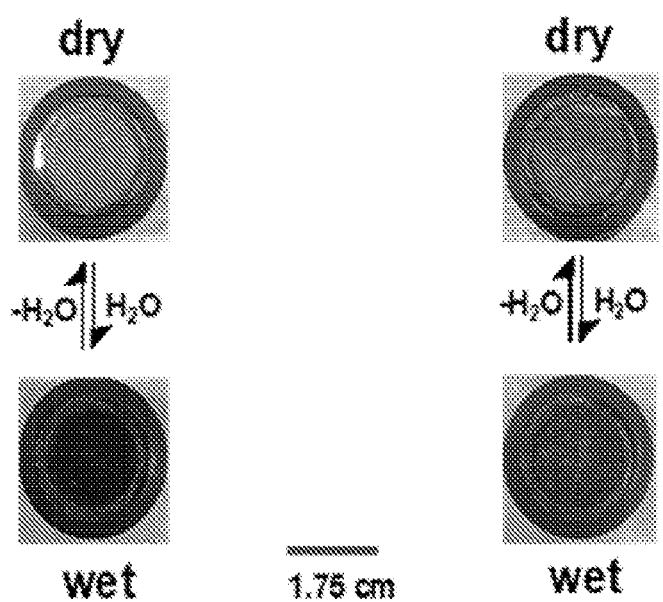

To understand how the observed mediachromism is related to the H-bond donating ability of the solvents, we compared the $\Delta K\text{-}M_{600}$ with the solvent pKa (FIG. 3D). The plot indicates that this optical change is, to some extent, governed by acidity of the H-bonding solvents, which is consistent with TD-DFT calculations on a model compound that showed the tautomerism is feasible in the presence of water with strong H-bonding donor ability. In addition to the iminol-keotenamine tautomerization, other factors, such as hydrophobicity, van der Waals interactions, and confinement effects may in principle contribute to the observed optical behavior. To account for these additional factors and validate the tautomeric origin for the optical changes in TAPB-PDA-OH COF, we compared the wet and dry absorbance of TAPB-PDA (FIG. 3E) and TAPB-PDA-OBu COFs (FIG. 3F), neither of which are capable of solvent-mediated tautomerism. While both exhibited limited solvatochromism, consistent with their donor-acceptor nature, neither exhibited the pronounced optical changes seen in the TAPB-PDA-OH COF.

To investigate the effect of structural regularity on the observed optical behavior, a largely amorphous cross-linked polymer was synthesized from TAPB and PDA-OH. While FT-IR confirmed imine polymerization, nitrogen sorption measurements showed that this material was of far lower surface area (ca. 40 $m^2 g^{-1}$). When exposed to $H_2O$, the cross-linked polymer exhibited a substantially diminished optical response (FIGS. 3G-3K), which we attribute to the restricted accessibility of the tautomeric sites in an amorphous cross-linked network. This contrasting behavior between a crystalline 2D COF and an amorphous polymer of similar chemical composition expands the growing body of literature that demonstrates the promise of structurally regular and porous materials for sensing applications.[22]

Tautomeric Switching Characterization. Having established the H-bonding response of the TAPB-PDA-OH COF, we characterized the presence and reversibility of the bisiminol and cis-iminol/ketoenamine moieties under solvation to further support the proposed tauatomerization behavior. FT-IR analyses of the dry and wet samples of TAPB-PDA-OH COF show a change in the stretching patterns in the range 1570-1660 $cm^{-1}$, which is attributed to the tautomerization of a proportion of the COF diiminols to cis-iminol/ketoenamine moieties. Specifically, an additional, slightly broad, feature is observed in the wetted COF at 1650 $cm^{-1}$ and is attributed to the presence of a ketoenamine (FIG. 4A).[10, 12] Solid-state $^{13}C$ cross-polarization magic angle spinning (CP-MAS) nuclear magnetic resonance (NMR) spectroscopy provided further support for the tautomeric change in the framework (FIG. 4B). The chemical shift of the imine carbon in the dry COF appears at 160 ppm, the intensity of which diminishes significantly in the wet sample with concomitant appearance of a new peak at 115 ppm, likely due to the ketone quaternary α-carbon.[9] The wet sample did not exhibit a new peak in the carbonyl region (>160 ppm); however, the ketoenamine form likely has significant contributions from a zwitterionic resonance structure reducing the carbonyl character of the CO carbon. Indeed, the DFT-optimized structure of a model compound indicates a C—O bond length of 1.26 Å in the single cis-ketoenamine form, between those of a typical C—O (1.4 Å) and C=O (1.2 Å) bonds. Thus, that the corresponding CO $^{13}C$ resonance may well overlap with some of those of the other $sp^2$ carbon atoms. As expected, analogous structural changes do not occur in either the TAPB-PDA or TAPB-PDA-OBu COFs, consistent with both these structural changes and the optical changes discussed above being related to the tautomerization.

We measured the diffraction patterns of the TAPB-PDA-OH COF in the presence of a variety of solvents using synchrotron X-ray radiation. Across a range of solvents, the COF crystallinity was unaffected, with the same number and approximate shape of diffraction features being observed in the presence and absence of solvents. However, the position of the in-plane diffraction features shifted when immersed in water. In particular, the (100) diffraction feature shifted to a real space d-spacing of 32 Å, which, as the COF dried, relaxed to its original position of 28 Å (FIG. 4D). This expanded unit cell may originate from the combination of bond-length differences and out-of-plane distortions of the ketoenamine and iminol tautomers and hints that responsive breathing behavior could be engineered in framework materials through the incorporation of tautomerically active states.[23-25] We also compared the MAS deuterium (2H) NMR spectra of the as-synthesized COF and a COF sample exposed to $D_2O$ and subsequently rigorously dried COF, the latter clearly showing the incorporation of D atoms into the COF structure in a rigid environment (FIG. 4C).[26] Deuterium incorporation suggests that the tautomeric changes are at least partially solvent-mediated, although a simple H/D of the phenolic OH with $D_2O$ could also be responsible for this observation. Taken together, these results suggest substantial solvent-mediated tautomerism in the TAPB-PDA-OH COF.

Figure 4E:
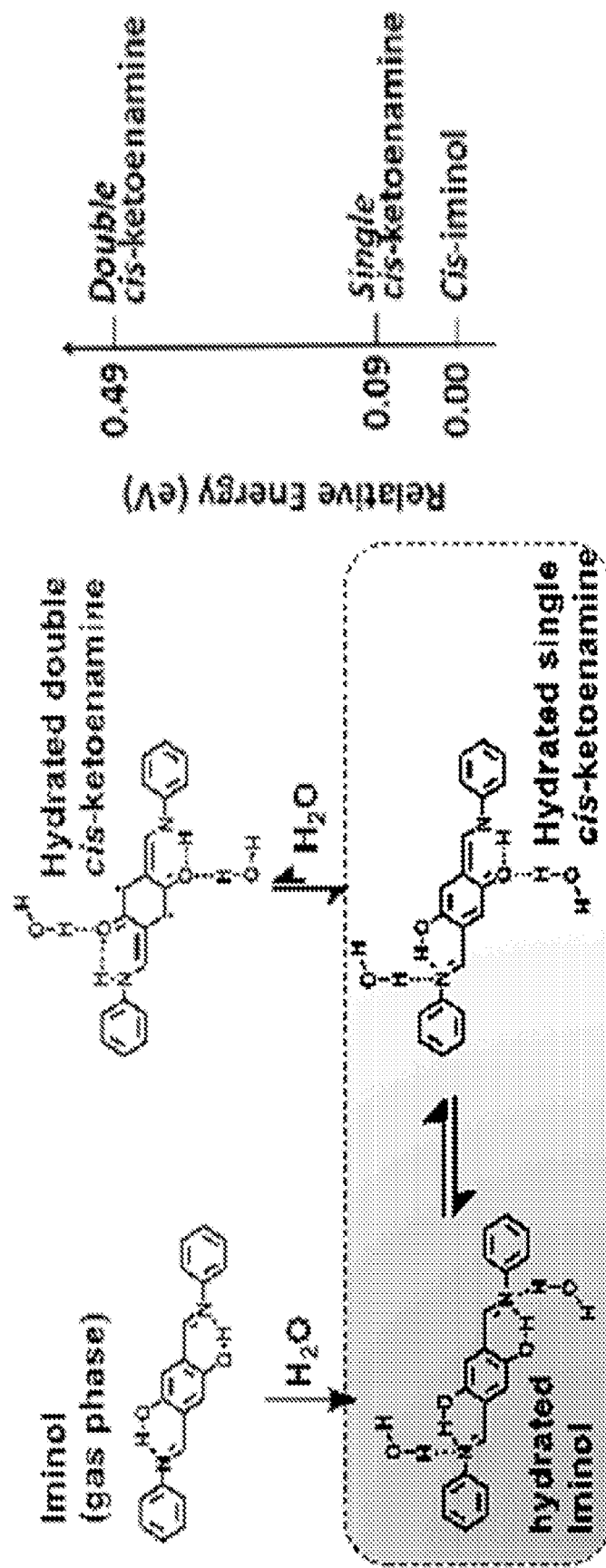

To gain further insight into the tautomeric behavior, we performed (TD-)DFT calculations on a model diiminol molecule (FIG. 4E). We find that the diiminol is the preferred tautomer in the gas phase, consistent with observations of the dry COF. But in the presence of two water molecules, the bisiminol and cis-iminol/ketoenamine are nearly isoenergetic, with the latter being only 0.09 eV (ca. 2 kcal mol$^{-1}$) less stable (FIG. 4E), consistent with the presence of significant quantities of both tautomers when wetted. The double cis-ketoenamine tautomer is significantly less stable (0.40 eV/9.2 kcal mol$^{-1}$ than the single cis-ketoenamine), consistent with the cross-conjugation present in the single cis-ketoenamine and the absence of a non-zwitterionic closed-shell resonance structure for the double ketoenamine, suggesting that the double ketoenamine is unlikely to be present in more than trace amounts. Formation of trans-iminol/ketoenamine was also found to significantly less favorable (by 0.47 eV/10.8 kcal mol$^{-1}$) than that of the cis-iminol/ketoenamine formation, strongly suggesting that the observed optical changes are not attributable to defect sites in the COF with trans geometries.

Figure 5A:
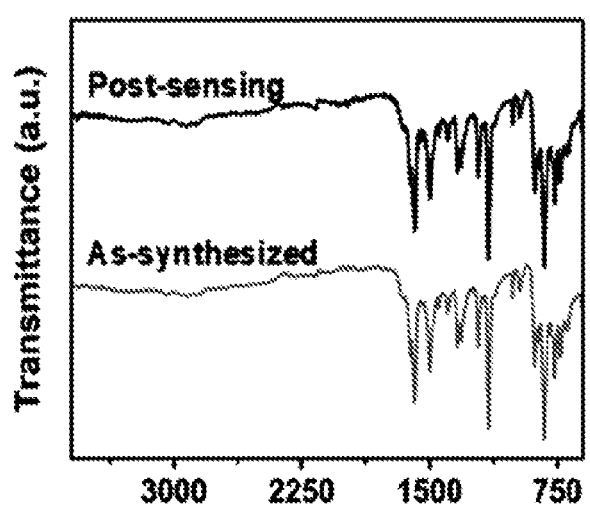
FIGS. 5A-5C. Traces correspond to as-synthesized and post-sensing (as-synthesized COF was soaked in water and then dried by critical point drying) TAPB-PDA-OH COFs.
Figure 5B:
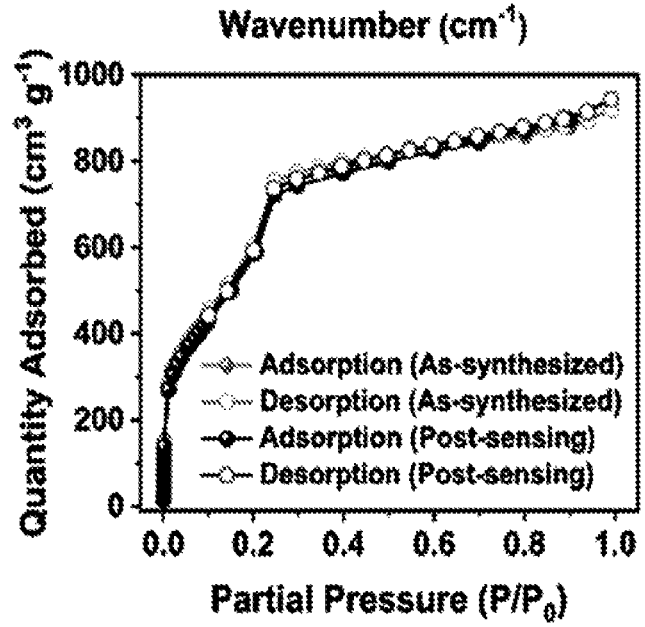
Figure 5C:
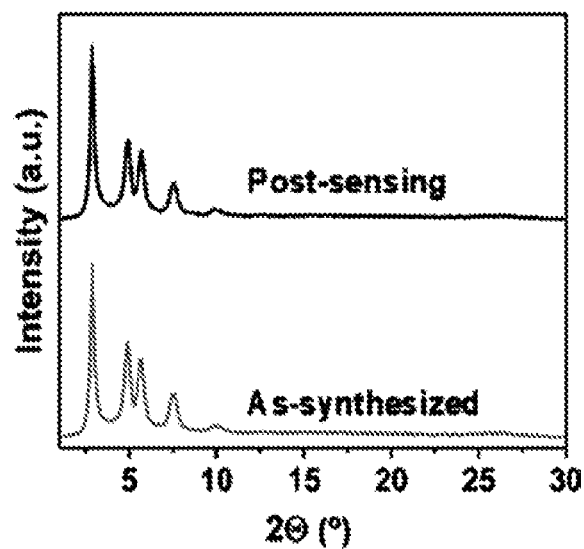

As the wet TAPB-PDA-OH COF dries, it reverts to a state which is indistinguishable from the original sample. For example, the FT-IR spectra of the two dry materials—before and after exposure to water—are nearly identical (FIG. 5A), indicating the reversibility of the process, as expected for a tautomerization. Importantly, the BET surface area and X-ray diffraction of the dried COF are almost unchanged from the as-synthesized material (FIG. 5B, 5C). This lack of hysteresis demonstrates that the structural changes are reversible when water is removed from the framework. These experiments suggest that tautomerism is an appealing sensing mechanism for applications that require long-term stability.

Figure 6A:
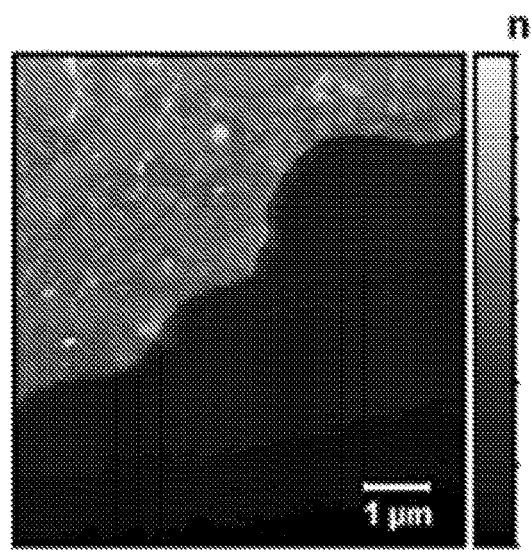
FIGS. 6A-6F.
Figure 6B:
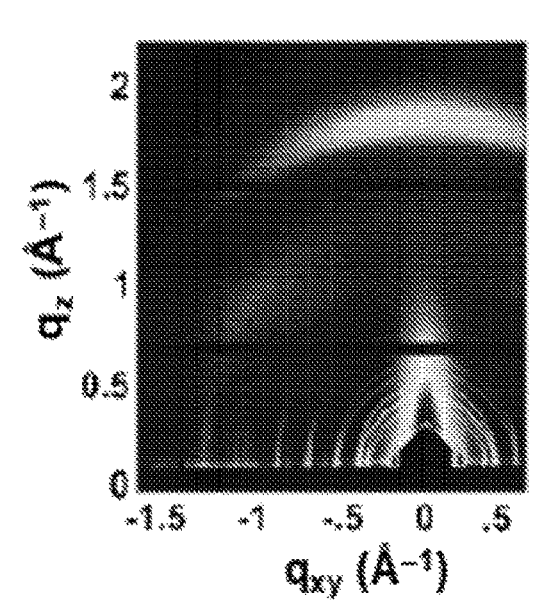

Humidity Sensing. To exploit the dynamic and reversible nature of the solvatochromic tautomerism, we fabricated a humidity detector in which a TAPB-PDA-OH COF thin film is monitored by transmission UV-vis spectroscopy (see FIG. 1D). We synthesized films with thicknesses of ca. 200 nm, which we anticipated would allow for substantial diffusion and thus rapid access of the volatile analytes, but also sufficient optical density to allow for sensing (FIG. 6A). To further enhance diffusive access to COF pores, the COFs were synthesized as highly oriented films with the pores perpendicular to the substrate. This orientation is confirmed by grazing-incidence wide-angle X-ray scattering (GI-WAXS) where the in-plane diffraction ((100) Bragg feature) is predominantly seen in the $q_{xy}$ plane and the out-of-plane diffraction ((001) Bragg feature) is located along the $q_z$ plane (FIG. 6B). Upon exposure to humidity, the optical responses of the COF films were found to be similar to those of the COF powders.

Figure 6C:
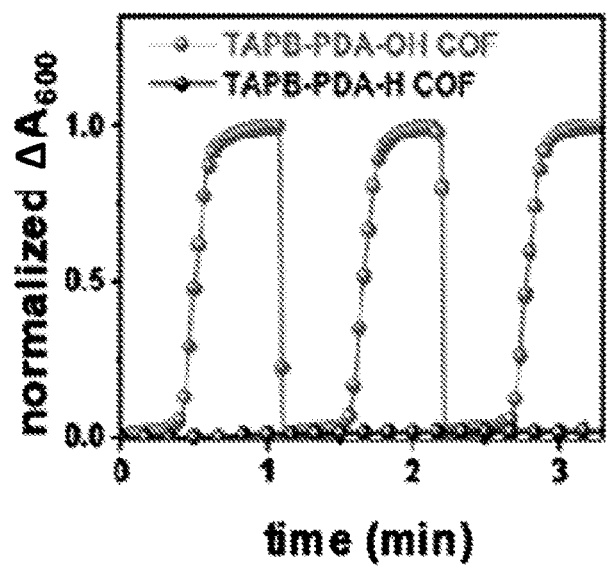
Figure 6D:
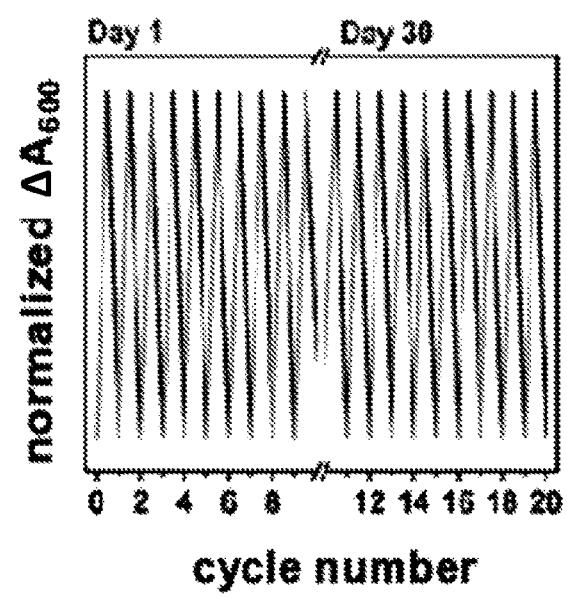
Figure 6E:
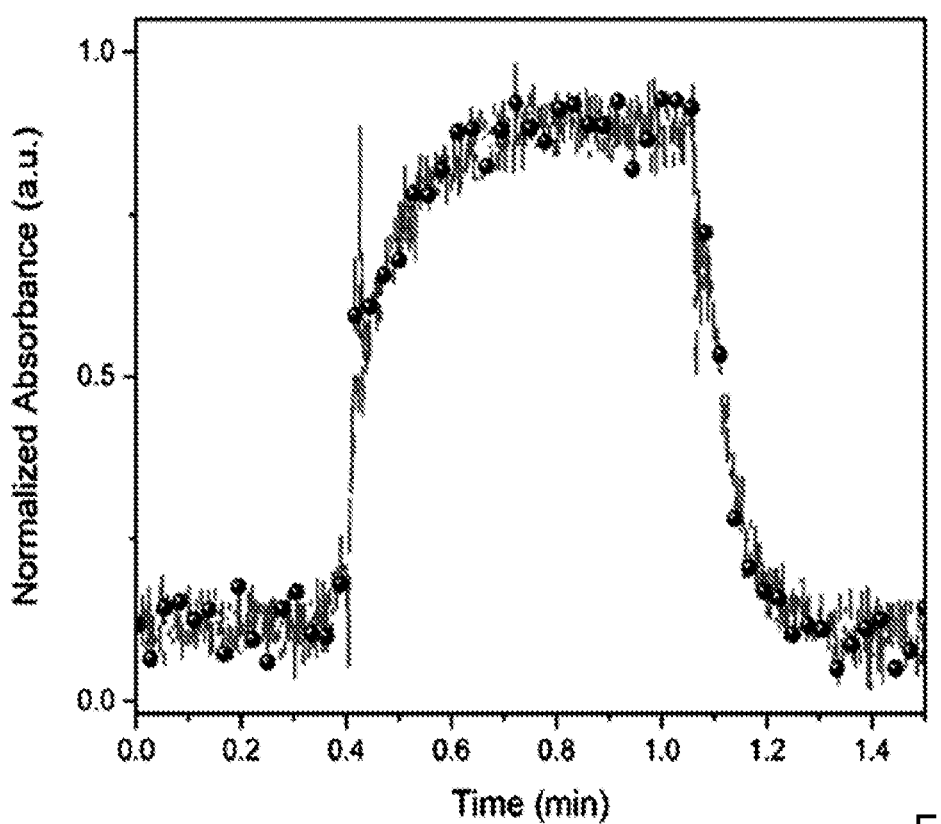
Figure 6F:
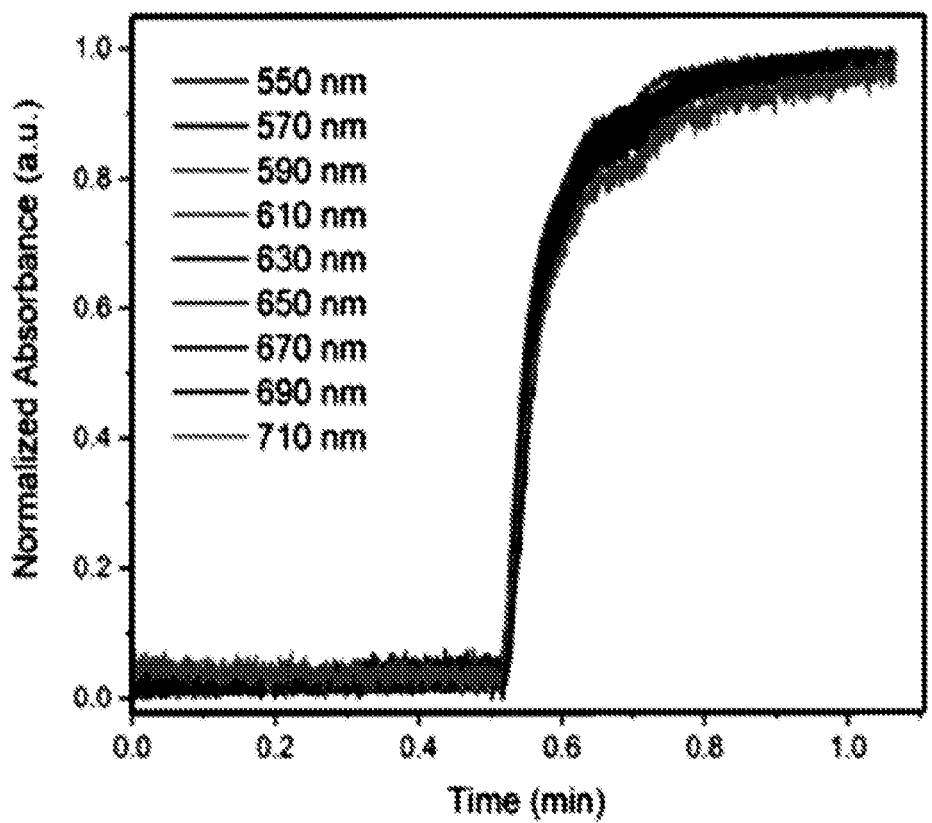

A humidity sensing experiment as performed in which the changes between dry and wet media in the absorbance of the COF at 600 nm, $\Delta A_{600}$, were monitored as a function (FIG. 6C). The TAPB-PDA-OH COF displayed a fast response of 9 s as the environment changes from dry to humid and less than 1 s when the humid air was changed to dry air. TAPB-PDA COF films did not exhibit any humidity-sensing changes in optical behavior, consistent with the observation in the powder, while the TAPB-PDA-OBu COF film displayed only small increases in absorbance (attributable to the weak solvatochromism seen in powders) and slower mediachromic response (ca. 15 s, FIG. 6E). We hypothesize that the slower response is in part due to its more hydrophobic pores; regardless, the slow kinetics of the already weakly responsive butoxy-functionalized COF suggest that side chains can be used to tune sensor performance. FIG. 6F shows that shows humidity sensing performed using TAPB-PDA-OH COF thin films at different wavelengths displays wavelength-independent response.

The sensors were passively regenerated when the humid environment was replaced with dry atmosphere. For example, we exposed the films to human breath and observed the same rapid and reversible optical switching. The TAPB-PDA-OH COF response is highly reversible over multiple cycles of exposure to dry and wet air; even after more than a month of ambient storage, we found that the performance of the last sensing experiment was indistinguishable from the first sensing, indicating the high-fidelity nature of this sensor (FIG. 6D). The stable, reversible, passive, nature of this sensing behavior shows that specific, highly responsive, rapid tautomeric sensing in a COF platform is attainable.

Conclusions. By synthesizing a COF containing 2,5-di (imine)-substituted 1,4-dihydroxybenzene moieties, we were able to achieve a delicate energy balance with a tautomer containing a iminol/cis-ketoenamine chromophore, and prevent tautomerization to a 'double cis-ketoenamine' due to cross-conjugation effects. This delicate balance between the energies of the tautomers allows for a dynamic iminol-to-ketoenamine tautomerization. A stronger acceptor nature of the central ring of the ketoenamine tautomer relative to that of the iminol results in a new charge-transfer-type excited state and a new visible absorption feature, which is easily detectable even by the naked eye. Previous COFs incorporating diiminols with the same connectivity also featured strong chromophores, such as porphyrins or phthalocyanines, whose intense visible absorption may have obscured the optical changes associated with tautomerization.[27] UV-vis spectroscopy, NMR spectroscopy, and density functional theory calculations clearly distinguished between the solvatochromism associated with other MOFs and COFs and the more complex and dramatic tautomerism-mediated mediachromism found in the TAPB-PDA-OH COF. Having validated the origin of the chemical response, we built a prototype humidity sensor that was found to be passively regenerated and active for at least two months. These results demonstrate practical tautomeric sensing capable of complex sensing responses for volatile analytes in these materials.

II. Materials and Methods

Materials. All monomers, solvents, and catalysts were either purchased from commercial sources or prepared following literature reported protocols. In particular, 1,3,5-tris (4-aminophenyl)benzene (TAPB) and mesitylene were procured from Alfa-Aesar. Terephthaldehyde and dioxane were purchased from Sigma-Aldrich. All materials were used as received without further purification. Glacial acetic acid was purchased from Fischer Scientific and used without additional purification. Deionized water was used throughout all experiments.

Solution Nuclear Magnetic Resonance Spectroscopy. $^1$H Nuclear Magnetic Resonance (NMR) spectra were acquired using a Bruker Avance III 400 MHz spectrometer using CDCl$_3$ as the solvent at 25° C. The chemical shifts were calibrated using the residual proton signal or the $^{13}$C signal of the solvent as an internal reference (CDCl$_3$: 7.26 ppm for $^1$H NMR, 77.00 ppm for $^{13}$C NMR).

Solid-State $^{13}$C CP/MAS NMR Spectroscopy. $^{13}$C Cross Polarization (CP) Magic Angle Spinning (MAS) spectra were recorded using a Bruker AV3-HD 300 NMR spectrometer operating at a $^{1}$H frequency of 300 MHz. Samples were investigated using a HX MAS probe operating with 4 mm MAS rotors at a selected spinning speed of 8 kHz. The contact time was 3 ms during a ramp-shaped 1H pulse. Up to 24576 scans were accumulated to detect the very weak peak at ca. 175 ppm. The chemical shifts were calibrated using adamantane as an external reference.

$^{2}$H MAS NMR Spectroscopy. TAPB-PDA-OH COF samples were immersed in $D_2O$ for 1 min at room temperature. Excess $D_2O$ was removed by blotting with a filter paper and the samples were subsequently rigorously dried under vacuum. These samples were then subjected to $^{2}$H MAS NMR investigation. $^{2}$H MAS NMR spectra were recorded using a HXY triple resonance MAS probe on a Bruker AV3-400 NMR spectrometer (2H frequency of 62 MHz) using a rotor synchronized solid-echo sequence where the spacing between pulse was set to be exactly one rotor period and the repetition delay was set to 4 s. It was necessary to accumulate 8192 scans to obtain data with a sufficiently high amount of signal. The excitation profile of the NMR probe was non-uniform. Hence experimental data were quite distorted with respect to the expected symmetry with respect to a mirror axis perpendicular to the excitation frequency as expected for a spin with I=1. As a compromise, the spectrum was symmetrized at the cost of destroying any chemical shift information associated with the center-peak and each spinning side band.

Fourier-Transform Infrared Spectroscopy. Infrared spectra were recorded on Shimadzu Prestige 21 FT-IR in attenuated total reflection mode using solid COF powder with an atmospheric background subtracted from all recorded spectra.

Diffuse Reflectance Spectroscopy (DRS). The DRS spectra were recorded at room temperature on a Cary 5000 UV-vis spectrometer equipped with an integrating sphere in the wavelength range 200-800 nm. The samples either in the dry or wet form were gently ground before all measurements. The scan rate was 400 nm/min with a resolution of 0.66 nm. Finely ground $BaSO_4$ was used as a reference. The absorption spectra were then obtained by using the Kulbeka-Munk function: $K-M=(1-R)^2/2R$, where R is the reflectance.

UV-Vis Spectroscopy of COF Films. UV-Vis absorbance spectra were recorded on a Cary 5000 UV-Vis-NIR spectrophotometer equipped with a mercury lamp. Substrates were mounted in a Cary film holder such that the film was perpendicular to the beam. Spectra were taken over a wavelength range of 200-850 nm with a 5 min collection time and 1 nm resolution.

Powder X-ray Diffraction. Powder x-ray diffraction (PXRD) patterns were recorded on a Malvern Panalytical Empyrean diffractometer in 2θ Bragg-Brentano geometry employing Cu Kα (λ=1.5406 Å) line focused radiation at 40 kV, 45 mA power and equipped with a PIXcel Medipix3 3D detector by Malvern PANalytical. Samples were placed on a silicon zero-background sample holder and then the sample surface was leveled with a clean microscope slide. No sample grinding was used prior to analysis unless otherwise stated. Data were measured using a continuous 2θ scan from 1.0-40° θ, while rotating. For all samples, no features are observed at θ>30°, and diffractograms are presented from 0-30° θ for visual clarity.

In Situ X-ray Diffraction. Small- and wide-angle X-ray scattering (SAXS/WAXS) patterns were collected at Argonne National Lab's Advanced Photon Source sectors 5-ID-D (DND-CAT) using a capillary transmission geometry. Experiments were conducted at a beam energy of 13.3 keV. 1 frame was collected for 1 second on a set of Pilatus detectors, which were then summed and radially integrated to produce a linear PXRD pattern using proprietary software available at the APS. Scattering intensity is reported as a function of the modulus of the scattering vector q, related to the scattering angle 2θ by the equation $q=(4\pi/\lambda)\sin\theta$, where λ is the x-ray wavelength. The sample-to-detector distance was adjusted to measure across relevant detection ranges of q. Capillary experiments were conducted using 2.0 mm OD borosilicate capillaries with 0.2 mm wall thicknesses purchased from Hilgenberg GmbH.

Grazing-Incidence X-ray Diffraction. GIWAXS measurements were performed at Advanced Photon Source at Argonne National Laboratory using the 8-ID-E Beamline. The films were irradiated to yield ca. 80% saturation of the detector at an incidence angle of 0.14° in vacuum using 10.92 keV (1.135 Å) x-rays. The scattering was recorded on a Pilatus 1 M detector located 228 mm from the sample. The raw images were merged, pixel coordinates were transformed to q-space, and line cuts generated using GIXSGUI for Matlab. For all patterns, we compared their transformed 1D patterns to the transmission polycrystallite diffraction patterns, all of which were found to be consistent.[1-2]

Critical Point Drying. The supercritical drying procedure was performed in a Tousimis Samdri795 critical point dryer. Prior to the supercritical drying process, all samples were placed in tea bags (ETS Drawstring Tea Filters, sold by English Tea Store, Amazon.com) and then soaked in absolute ethanol to keep the samples wet (typically 5-15 min). The drying chamber is first cooled ('cool' valve meter set to 0.40), and the tea bags containing the samples were then placed in it, and the chamber is filled with absolute ethanol and then sealed. The chamber was then filled with liquid $CO_2$ ('fill' valve meter set to 0.40), and after 2 min, the samples were purged for 30 min ('purge-vent' valve meter set to 0.15, and 'purge timer' valve meter set to 6). The temperature was then raised to 40° C., resulting in a chamber pressure of around 1300 psi, which is well above the critical point of $CO_2$. The chamber was held above the critical point for 30 min, after which the $CO_2$ source was turned off, and the pressure was released over a period of 30 min ('bleed' valve meter set at 0.07). The samples were then transferred to vials and their final mass were weighed.

Nitrogen Sorption Isotherms. Nitrogen sorption isotherms were collected on a Micromeritics 3Flex Physisorption Surface Area and Porosimetry Analyzer using between 10 and 50 mg. Samples were transferred to dried and tared analysis tubes equipped rubber cap. Samples were heated from room temperature to 150° C. at a rate of 10° C./min and held at that temperature for 3 h under nitrogen flow to degas the COF samples. Nitrogen isotherms were collected by incremental exposure of $N_2$ up to 760 mmHg (1 atm) using UHP-grade (99.999% purity) $N_2$ at 77 K in a liquid nitrogen bath. $N_2$ adsorption/desorption isotherms, BET surface areas, pore size distributions and other derived measurements were generated using the instruments native software (3Flex Share Version 5.0k). Oil-free vacuum pumps and oil-free pressure regulators were used for all measurements. Brunauer-Emmett-Teller (BET) surface areas were calculated from the linear region of the $N_2$ isotherm at 77 K within the pressure range P/Po of 0.05-0.10 so that the linear model fit had an $R^2$ of greater than 0.999.

Structural Modeling. Crystal modeling of the COF structures was carried out using the Materials Studio (ver.5.0) suite of programs by Accelrys. The initial structures were constructed piecewise starting with a primitive hexagonal unit cell with space group P6. The a/b cell parameter was estimated according to the distance between the center of the vertices for each COF, and c parameter was chosen as 3.35 Å, which has been observed for similar materials. The structures were optimized using a Geometry Optimization routine including energy minimization with cell-parameter optimization, using the parameters from the Universal Force Field. Calculation of the simulated powder diffraction patterns and Pawley refinements were performed in the Materials Studio Reflex Plus Module using a Bragg-Brentano geometry. The observed diffraction patterns were subjected to a polynomial background subtraction and then to Pawley refinement wherein peak profile were refined using the Pseudo-Voigt peak shape function and asymmetry was corrected using the Berar-Baldinozzi function. Crystallite size was then estimated by the LeBail method which was Pawley refined to the experimental data. Surface-area calculations were carried out using a Connolly surface calculation using the appropriate parameters for nitrogen as the adsorbed gas.

Solvent Accessibility Calculations. Theoretical water loading on the COF structure was calculated using the sorption module of Materials Studio by applying a Monte Carlo algorithm where water molecules were added to the unit cell until no additional molecules could be added based on their Van der Waals radii.

Atomic Force Microscopy. Atomic force microscopy (AFM) images were taken using a SPID Bruker FastScan AFM using a tapping mode. Films were scored using Teflon tipped forceps before imaging to create a level substrate surface to which we could compare the height of the film.

Density Functional Theory Calculations. Ground-state geometry optimizations and single-point calculations on the iminol and ketoenamine model compounds were performed using density functional theory (DFT) method with the tuned long-range corrected ωB97X-D functional and 6-31G (d) basis set, which has been demonstrated to describe molecular geometric and electronic properties reliably.[3-4] The time-dependent density functional theory (TD-DFT) approach was then employed to study the electronic excited states and simulate the optical absorption spectra. Natural transition orbitals (NTOs)[5] were used to visualize the hole and electron wavefunctions in the excited states. All quantum-chemical calculations were performed with the Gaussian 09 Rev D01 program.[6]

Humidity Sensing Experiments. FIG. 1E illustrates an exemplary sensor. Dry films were loaded in glass scintillation vials, which were subsequently capped with septa. The set up was placed on the UV-vis sample holder such that the film is facing the detector. Through the septum, three needles were introduced, which were used as a dry nitrogen inlet, a humid nitrogen inlet, and an outlet. To obtain the humid nitrogen, nitrogen gas was bubbled through three closed water reservoirs before entering into the detection chamber. The switching between humid and dry nitrogen gases was performed manually using a three-way valve. Changes in absorbance were recorded as the environment was changed from dry to wet and vice versa in a Cary 5000 UV-Vis spectrometer. Response times were calculated by a linear onset method by calculating the time taken for the sample to increase its response amount from 10-80% of the maximum response.

III. Synthetic Procedures for Covalent Organic Framework Monomers

Scheme 1 illustrates the synthesis of 2,5-dihydroxy-terepthaldehyde (PDA-OH).

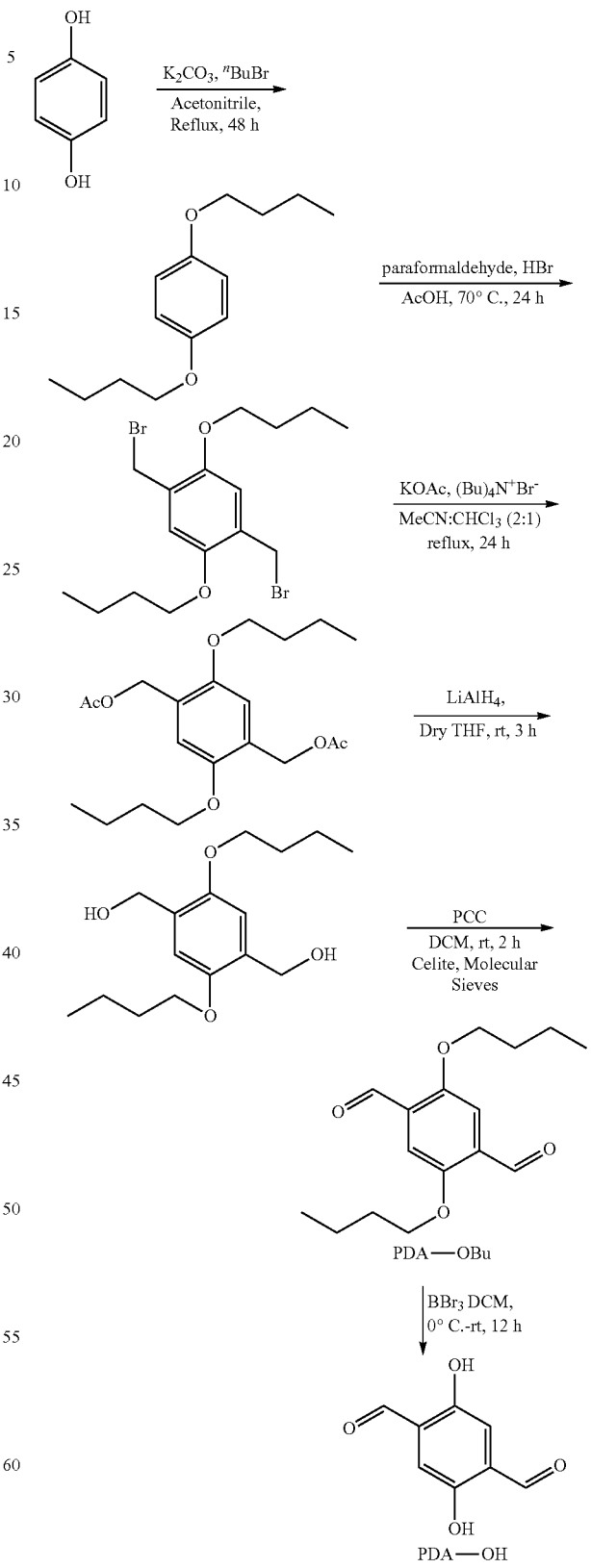

Synthesis of 1,4-bis(butyloxy)benzene. A suspension of hydroquinone (10.00 g, 90.81 mmol), bromobutane (38.20 g, 272.5 mmol), and potassium carbonate (37.65 g, 272.45 mmol) in 180 mL of acetonitrile was refluxed for 48 h under nitrogen atmosphere. After 48 h, the reaction mixture was cooled, and then the solvent was removed using rotary evaporation. The obtained brown solid was melted, then poured into water, producing a precipitate which was filtered and dried under high vacuum overnight to obtain an off-white solid (yield 16.24 g, 80%). The $^1$H NMR spectrum was consistent with literature.[7] $^1$H NMR (CDCl$_3$, 400 MHz): δ (ppm)=6.82 (s, 2H), 3.91 (t, J=8.0 Hz, 4H), 1.71-1.78 (m, 4H), 1.44-1.53 (m, 4H), 0.97 (t, J=8.0 Hz, 6H).

Synthesis of 1,4-dibromomethyl-2,5-dibutyloxybenzene. 1,4-Dibutyloxybenzene (16.24 g, 73.05 mmol) and paraformaldehyde (4.61 g, 153.4 mmol) were weighed into a clean and dry 500 mL three-neck round bottom flask. The flask was evacuated, flushed with nitrogen, and 200 mL of acetic acid was added and stirred to form a suspension. To this 31 mL of hydrobromic acid in acetic acid (33% wt/wt) was added slowly. The reaction was heated to 70° C., stirred overnight, and its progress was monitored via thin-layer chromatography. The reaction mixture was poured into 500 mL of ice-cold water, producing an unfilterable fine white precipitate. The water/precipitate mixture was extracted three times with a total of 300 mL of dichloromethane. The combined organic layers were washed with deionized water, then dried over anhydrous sodium sulfate. The dichloromethane was removed using rotary evaporation, yielding a black solid, which was purified using a short silica-gel column and 500 mL of 1:5 dichloromethane:hexanes as the eluent. The solvent was removed via rotary evaporator, yielding 5.35 g (18% if pure) of a brown solid which was carried forward without further purification. $^1$H NMR (CDCl$_3$, 400 MHz): δ (ppm)=6.85 (s, 2H), 4.53 (s, 4H), 3.99 (t, J=6.0 Hz, 4H), 1.76-1.83 (m, 4H), 1.49-1.57 (m, 4H), 0.99 (t, J=8.0 Hz, 6H).

Synthesis of (2,5-dibutoxy-1,4-phenylene)bis(methylene) diacetate. 1,4-Bis(bromomethyl)-2,5-dibutoxybenzene (4.49 g, 11.00 mmol) and potassium acetate (3.24 g, 33.00 mmol) were weighed into a three-neck round bottom flask. The flask was evacuated and then flushed with nitrogen. 100 mL of acetonitrile and 50 mL of chloroform were added to the flask. The reaction mixture was refluxed overnight. After cooling to rt, the reaction mixture was poured into 300 mL of water and extracted chloroform (3×100 mL). The combined organic extracts were washed three times with 300 mL water, then dried over anhydrous sodium sulfate. The solution was evaporated using rotary evaporation and subsequently dried under high vacuum for 24 hours at room temperature to yield 3.69 g (77%, assuming pure 1,4-dibromomethyl-2,5-dibutyloxybenzene starting material) of the desired compound, which was directly used in the next step. $^1$H NMR (CDCl$_3$, 400 MHz): δ (ppm)=6.88 (s, 2H), 5.13 (s, 4H), 3.95 (t, J=6.0 Hz, 4H), 2.10 (s, 6H), 1.71-1.78 (m, 4H), 1.44-1.53 (m, 4H), 0.97 (t, J=6.0 Hz, 6H).

Synthesis of (2,5-dibutoxy-1,4-phenylene)dimethanol. Lithium aluminum hydride (1.91 g, 50.3 mmol) was suspended in 150 mL of dry THF under an inert atmosphere. A solution of (2,5-bis(butoxy)-1,4-phenylene)dimethanol, (3.69 g, 10.1 mmol) in 50 mL THF was added dropwise to the LiAlH$_4$ suspension. The reaction was stirred at room temperature 3 h. The reaction was quenched using 50 mL of ice-cold ethyl acetate. The reaction mixture was then poured into 400 mL water and extracted with ethyl acetate (3×200 mL). The combined extracts were washed with water, dried over anhydrous sodium sulfate, and dried using rotary evaporation. Drying under high vacuum yielded the desired product as a colorless solid (2.07 g, 73%).[8] $^1$H NMR (CDCl$_3$, 400 MHz): δ (ppm)=6.85 (s, 2H), 4.66 (d, J=4.0 Hz, 4H), 3.99 (t, J=8.0 Hz, 4H), 2.39 (t, J=8.0 Hz, 2H), 1.76-1.80 (m, 4H), 1.44-1.53 (m, 4H), 0.98 (t, J=8.0 Hz, 6H).

Synthesis of 2,5-dibutoxyterephthalaldehyde. 1.643 g (5.818 mmol) of (2,5-dibutoxy-1,4-phenylene)dimethanol was dissolved in 100 mL dry dicholoromethane and added to 5.016 grams of PCC (23.27 mmol), with 20 grams of celite and 20 grams of molecular sieves in a nitrogen flushed round bottom flask. The resulting mixture was stirred for 2 h under nitrogen at room temperature, then was filtered through a pad of silica gel. The solvent was removed via rotary evaporation to yield a solid product, which was purified using a short silica gel column eluted with dicholoromethane until no more yellow coloration was observed in the eluent flow. Removal of the solvent afforded the final compound as a bright fluorescent yellow compound (1.01 g, 57%). The $^1$H NMR spectrum was consistent with previous reports.[7] $^1$H NMR (CDCl$_3$, 400 MHz): δ (ppm)=10.52 (s, 2H), 7.43 (s, 2H), 4.10 t, J=8.0 Hz, 4H), 1.79-1.86 (m, 4H), 1.47-1.56 (m, 4H), 0.99 (t, J=8.0 Hz, 6H).

2,5-Dihydroxyterepthaldehyde. This compound was synthesized by dealkylation of the 2,5-dibutoxyterephthaldehyde. A 250 mL round-bottom flask was charged with 2,5-dibutoxy terephthaldehyde (2 g, 7.2 mmol, 1 equivalent) and 50 mL dicholoromethane. The solution was cooled to 0° C. and then BBr$_3$ (1 M in dicholoromethane) solution (21.6 mL, 21.6 mmol, 3 equivalents) was added dropwise. Subsequently the reaction was warmed to room temperature and stirred 12 h. At the end of this period, the mixture was then cooled to 0° C. and quenched by very careful dropwise addition of water. The mixture was extracted with dicholoromethane, dried over anhydrous Na$_2$SO$_4$, and solvent was removed using rotary evaporation to obtain a yellow solid (1.16 g, yield: 98%). Collected NMR spectra were consistent with previous reports[9] of this material. $^1$H NMR (CDCl$_3$, 400 MHz): δ (ppm)=10.24 (s, 2H), 9.98 (s, 2H), 7.28 (s, 2H).

IV. Covalent Organic Frameworks Synthetic Procedures

General procedure of the synthesis of the COFs. 1,3,5-tris(aminophenyl)benzene (TAPB) and aromatic dialdehyde (PDA-X) are weighed into a screw-capped scintillation vial in a 2:3 molar ratio. A solvent mixture of 4:1 p-dioxane: mesitylene are added and the mixture is pre-heated to dissolve the monomers. To this transparent solution, aqueous acetic acid is added. The mixture is then heated at 70° C. for 72 h. After this period, the mixture is cooled to room temperature, filtered, and washed with approximately 100 mL of methanol and activated using supercritical carbon dioxide (scCO$_2$) critical point drying prior to characterization.

TAPB-PDA COF. TAPB (55 mg, 0.16 mmol, 2 equivalents), terephthaldehyde (31 mg, 0.23 mmol, 3 equivalents), dioxane (5 mL) and mesitylene (1.25 mL) were charged in a 20 mL scintillation vial. The mixture was sealed and heated to 70° C. until dissolution of the monomers was observed, after which an AcOH solution (3 mL, 10.5 M) was added. The solution gelled within minutes and the mixture was maintained at 70° C. for 72 h without stirring. The work up procedure as described above afforded the TAPB-PDA COF as a yellow solid (70 mg, 89% yield).

TAPB-PDA-OH COF. TAPB (20 mg, 0.06 mmol, 2 equivalents), 2,5-dihydroxyterephthaldehyde (14 mg, 0.09 mmol, 3 equivalents), dioxane (1.6 mL) and mesitylene (0.4 mL) were charged in a 20 mL scintillation vial. The mixture was sealed and heated to 70° C. until dissolution of the monomers was observed. At this point, AcOH solution (0.2 mL, 3 M) was added. The solution gelled within minutes and the mixture was maintained at 70° C. for 72 h without stirring. The work up procedure as described above afforded the TAPB-PDA-OH COF as a yellow solid (32 mg, 93% yield).

TAPB-PDA-OBu COF. TAPB (33 mg, 0.09 mmol, 2 equivalents), 2,5-dibutoxyterephthaldehyde (27 mg, 0.14 mmol, 3 equivalents), dioxane (1.6 mL) and mesitylene (0.4 mL) were charged in a 20 mL scintillation vial. The mixture was sealed and heated to 70° C. until dissolution of the monomers was observed. At this point, AcOH solution (1 mL, 10.5 M) was added. The solution gelled within minutes and the mixture was maintained at 70° C. for 72 h without stirring. The work up procedure as described above afforded the TAPB-PDA-OBu COF as a yellow solid (51 mg, 88% yield).

V. Synthesis and Characterization of Amorphous, Nonporous, TAPB-PDA-OH Polymer Synthesis. TAPB (20 mg, 0.06 mmol, 2 equivalents), 2,5-dihydroxyterephthaldehyde (14 mg, 0.09 mmol, 3 equivalents), dioxane (1.6 mL) and mesitylene (0.4 mL) were charged in a 20 mL scintillation vial. The mixture was sealed and heated to 70° C. until dissolution of the monomers was observed. At this point, AcOH solution (0.2 mL, 3 M) was added. The solution gelled within minutes and the mixture was heated at 70° C. for 10 min without stirring. The work up procedure as described above for other COFs afforded the TAPB-PDA-OH polymer as a yellow solid (32 mg, 93% yield).

VI. Acid-Base Optical Spectroscopy for TAPB-PDA-X COFs

Figure 7A:
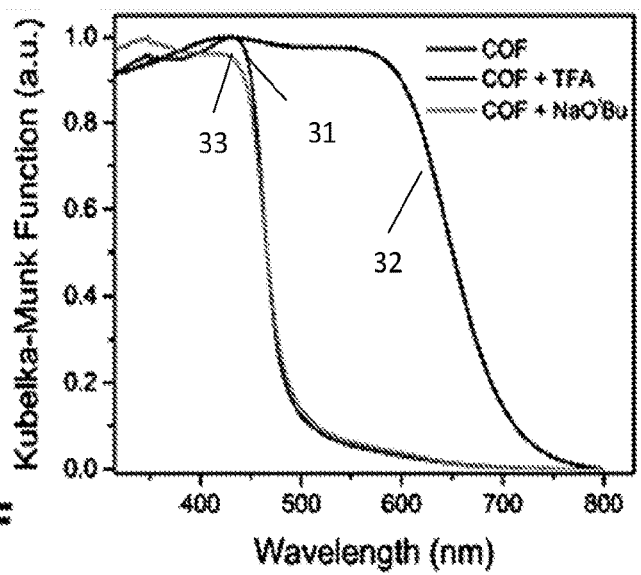
FIGS. 7A-7C show DRS of the dry, acid and base-treated TAPB-PDA (FIG. 7A) (labels COF 31, COF+TFA 32, and COF+NaO$^t$Bu 33), TAPB-PDA-OBu (FIG. 7B) (labels COF 41, COF+TFA 42, and COF+NaO$^t$Bu 43), and TAPB-PDA-OH (FIG. 7C) (labels COF 51, COF+TFA 52, and COF+NaO$^t$Bu 53) COFs. All COFs exhibited red-shifted response in acid due to protonation of the imine moiety. Only TAPB-PDA-OH COF exhibited slight base-mediated response due to partial deprotonation of the phenolic moieties.
Figure 7B:
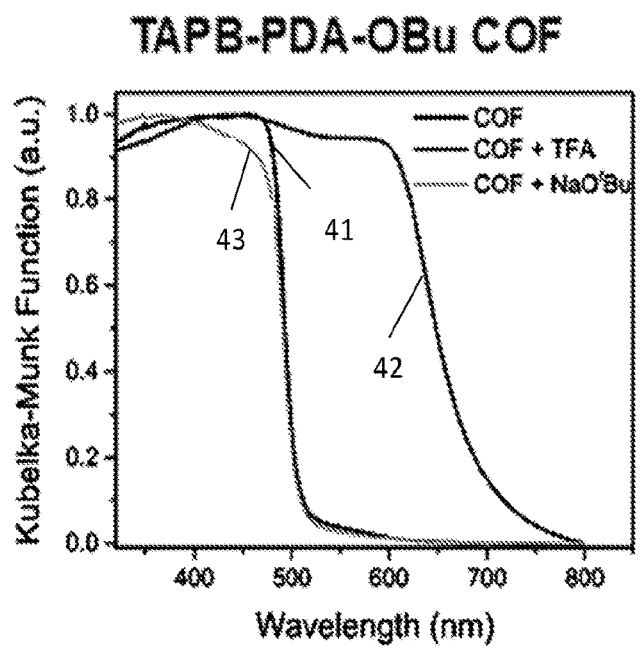
Figure 7C:
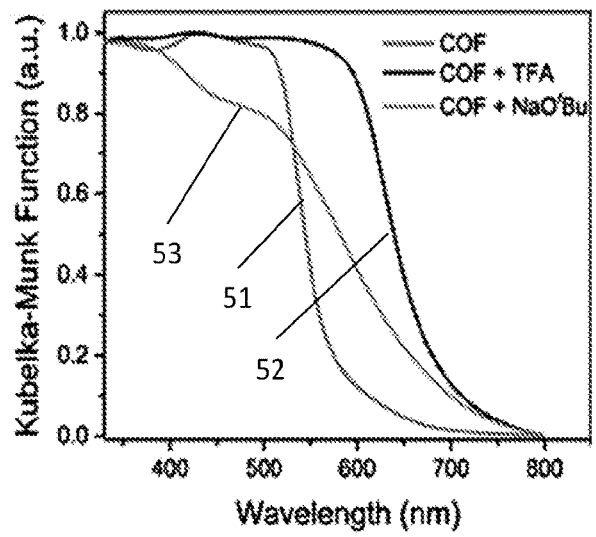

The donor and acceptor strengths of ketoenamine-iminol tautomers are known to be influenced by protonation/deprotonation. The acceptor strength of the imine moiety can be enhanced by an acidic proton, by either the formation of a hydrogen bond between a H-donor and the imine, inducing a partial positive charge on the imine acceptor, or by protonation to form the positively charged iminium functional group. Similarly, a base can either act as a hydrogen bond acceptor with the phenolic moiety as the donor or fully deprotonated phenolate. In the presence of an amphiprotic species, each of these mechanisms may be relevant and both mechanisms are expected to cause a red-shift in the CT band, which may manifest in the water-triggered TAPB-PDA-OH COF chromism. Two limiting cases—protonation of the imine by trifluoroacetic acid (TFA) and deprotonation of phenol by sodium tert-butoxide—were examined to give insight into the results obtained in aqueous media. All three COFs contain the imine acceptor group, and upon treatment with TFA exhibited a new CT band at longer wavelength (FIGS. 7A-7C). This is consistent with the protonation mechanism laid out above; however, the fact that water alone does not cause any red-shift in TAPB-PDA COF is in direct contrast with a protonation mechanism when in the presence of water alone. When treated with NaO$^t$Bu the TAPB-PDA and TAPB-PDA-OBu COFs, which each lack a phenolic proton that can be abstracted by the alkoxide base, did not show any change in the DRS, whereas the NaO$^t$Bu-treated TAPB-PDA-OH COF exhibited a broad red-shifted CT band at a longer wavelength (>550 nm, FIG. 7C). Presumably deprotonation of the phenolic OH groups to afford phenoxide groups is responsible for this optical difference. For these reasons, we infer that a set of mechanisms which are difficult to deconvolute participate in the primarily tautomeric mediachromism.

VII. Wet/Dry $^2$H NMR Spectroscopy of TAPB-PDA-OH COF Soaked with D$_2$O

The as-synthesized COF did not exhibit any detectable signal due to D under standard experimental conditions, as expected from the low natural abundance of D. The D$_2$O-exchanged COF sample exhibited a weak but detectable $^2$H NMR signal under conditions of magic angle spinning (MAS) at 10 kHz. Notably many peaks were observed, which indicated that this signal is not due to "free" D$_2$O. A series of peaks separated by the spinning MAS speed was observed (FIG. 4C). These peaks outline an envelope consistent with a typical Pake spectrum characterized by a quadrupolar splitting of ca. 120 kHz. This observation is a clear indication that the D nuclei are not experiencing any large-angle molecular motions (for example, rotation about a two-fold axis would lead to ca. half of this splitting), and, therefore, must be incorporated in a rigid position in the COF.

VIII. Synthesis of COF Thin Films

COF Films were synthesized by immersing a fused silica substrate into a solvothermal reaction mixture. First, a 10 mL solution (4:1 p-dioxane:mesitylene) of 5 mM TAPB (1 equiv, 17.5 mg) and 7.5 mM aromatic dialdehyde (1.5 equiv: PDA: 10.0 mg, PDA-OH: 12.4 mg, PDA-OBu: 20.9 mg) was created by bath sonicating the COF monomers to dissolve them in the specified solvent mixture. To this solution, a fused silica substrate was added such that it was fully immersed in the reaction solvent. Then, 5 vol % (500 µL) of 9M aqueous acetic acid was added as a catalyst. These samples were sealed and heated to 70° C. for 3 days at which point a film deposited onto the surface of this substrate was observed as well as the precipitation of bulk COF powder.

Finally, these samples were cooled to room temperature and the substrates were removed from the reaction mixture. At this point, samples were placed in a clean solution of methanol and bath sonicated for one minute. This process was repeated ten times to attempt the removal of all non-COF film materials. Finally, the substrates were allowed to dry in air. At this point, the COF film substrates were found to be yellow but optically transparent with very minor scattering.

IX. References of Section I

1. Antonov, L.; Deneva, V.; Simeonov, S.; Kurteva, V.; Nedeltcheva, D.; Wirz, J., Exploiting tautomerism for switching and signaling. *Angew. Chem., Int. Ed.* 2009, 48 (42), 7875-7878.
2. Colson, J. W.; Dichtel, W. R., Rationally synthesized two-dimensional polymers. *Nat. Chem.* 2013, 5 (6), 453-65.
3. Huang, N.; Wang, P.; Jiang, D., Covalent organic frameworks: a materials platform for structural and functional designs. *Nat. Rev. Mat.* 2016, 1 (10), 16068.
4. Evans, A. M.; Ryder, M. R.; Flanders, N. C.; Vitaku, E.; Chen, L. X.; Dichtel, W. R., Buckling of Two-Dimensional Covalent Organic Frameworks under Thermal Stress. *Ind. Eng. Chem. Res.* 2019, 58 (23), 9883-9887.

5. Lohse, M. S.; Bein, T., Covalent organic frameworks: Structures, synthesis, and applications. *Adv. Func. Mater.* 2018, 28 (33), 1705553.
6. Bisbey, R. P.; Dichtel, W. R., Covalent organic frameworks as a platform for multidimensional polymerization. *ACS Cent. Sci.* 2017, 3 (6), 533-543.
7. Ascherl, L.; Evans, E. W.; Hennemann, M.; Di Nuzzo, D.; Hufnagel, A. G.; Beetz, M.; Friend, R. H.; Clark, T.; Bein, T.; Auras, F., Solvatochromic covalent organic frameworks. *Nat. Comm.* 2018, 9 (1), 3802.
8. Chong, J. H.; Sauer, M.; Patrick, B. O.; MacLachlan, M. J., Highly stable keto-enamine salicylideneanilines. *Org. Lett.* 2003, 5 (21), 3823-3826.
9. DeBlase, C. R.; Silberstein, K. E.; Truong, T.-T.; Abruna, H. D.; Dichtel, W. R., (3-Ketoenamine-linked covalent organic frameworks capable of pseudocapacitive energy storage. *J. Am. Chem. Soc.* 2013, 135 (45), 16821-16824.
10. Kandambeth, S.; Mallick, A.; Lukose, B.; Mane, M. V.; Heine, T.; Banerjee, R., Construction of crystalline 2D covalent organic frameworks with remarkable chemical (acid/base) stability via a combined reversible and irreversible route. *J. Am. Chem. Soc.* 2012, 134 (48), 19524-7.
11. Daugherty, M. C.; Vitaku, E.; Li, R. L.; Evans, A. M.; Chavez, A. D.; Dichtel, W. R., Improved synthesis of β-ketoenamine-linked covalent organic frameworks via monomer exchange reactions. *Chem Commun* 2019, 55 (18), 2680-2683.
12. Ning, G. H.; Chen, Z. X.; Gao, Q.; Tang, W.; Chen, Z. X.; Liu, C. B.; Tian, B. B.; Li, X.; Loh, K. P., Salicylideneanilines-Based Covalent Organic Frameworks as Chemoselective Molecular Sieves. *J. Am. Chem. Soc.* 2017, 139 (26), 8897-8904.
13. Kandambeth, S.; Venkatesh, V.; Shinde, D. B.; Kumari, S.; Halder, A.; Verma, S.; Banerjee, R., Self-templated chemically stable hollow spherical covalent organic framework. *Nat. Comm.* 2015, 6, 6786.
14. Li, R. L.; Flanders, N. C.; Evans, A. M.; Ji, W.; Castano, I.; Chen, L. X.; Gianneschi, N. C.; Dichtel, W. R., Controlled growth of imine-linked two-dimensional covalent organic framework nanoparticles. *Chem. Sci.* 2019, 10 (13), 3796-3801.
15. Smith, B. J.; Overholts, A. C.; Hwang, N.; Dichtel, W. R., Insight into the crystallization of amorphous imine-linked polymer networks to 2D covalent organic frameworks. *Chem Commun* 2016, 52 (18), 3690-3693.
16. Le Bail, A.; Jouanneaux, A., A qualitative account for anisotropic broadening in whole-powder-diffraction-pattern fitting by second-rank tensors. *J Appl Crystallogr* 1997, 30 (3), 265-271.
17. Sing, K., The Use of Nitrogen Adsorption for the Characterization of Porous Materials: Review. *Colloids and Surf, A* 187, 188.
18. Connolly, M. L., Analytical Molecular-Surface Calculation. *J Appl Crystallogr* 1983, 16 (Oct), 548-558.
19. Landers, J.; Gor, G. Y.; Neimark, A. V., Density functional theory methods for characterization of porous materials. *Colloid Surface A* 2013, 437, 3-32.
20. Nekoeinia, M.; Yousefinejad, S.; Abdollahi-Dezaki, A., Prediction of E TN Polarity Scale of Ionic Liquids Using a QSPR Approach. *Ind. Eng. Chem. Res.* 2015, 54 (50), 12682-12689.
21. Reichardt, C., Solvatochromic Dyes as Solvent Polarity Indicators. *Chem Rev* 1994, 94 (8), 2319-2358.
22. Lustig, W. P.; Mukherjee, S.; Rudd, N. D.; Desai, A. V.; Li, J.; Ghosh, S. K., Metal-organic frameworks: functional luminescent and photonic materials for sensing applications. *Chem. Soc. Rev.* 2017, 46 (11), 3242-3285.
23. Wei, Y. S.; Chen, K. J.; Liao, P. Q.; Zhu, B. Y.; Lin, R. B.; Zhou, H. L.; Wang, B. Y.; Xue, W.; Zhang, J. P.; Chen, X. M., Turning on the flexibility of isoreticular porous coordination frameworks for drastically tunable framework breathing and thermal expansion. *Chem. Sci.* 2013, 4 (4), 1539-1546.
24. Finsy, V.; Kirschhock, C. E.; Vedts, G.; Maes, M.; Alaerts, L.; De Vos, D. E.; Baron, G. V.; Denayer, J. F., Framework breathing in the vapour-phase adsorption and separation of xylene isomers with the metal-organic framework MIL-53. *Chem.-Eur. J.* 2009, 15 (31), 7724-7731.
25. Serre, C.; Bourrelly, S.; Vimont, A.; Ramsahye, N. A.; Maurin, G.; Llewellyn, P. L.; Daturi, M.; Filinchuk, Y.; Leynaud, O.; Barnes, P., An explanation for the very large breathing effect of a metal-organic framework during $CO_2$ adsorption. *Adv. Mater.* 2007, 19 (17), 2246-2251.
26. Hansen, M. R.; Graf, R.; Spiess, H. W., Solid-State NMR in Macromolecular Systems: Insights on How Molecular Entities Move. *Accounts Chem Res* 2013, 46 (9), 1996-2007.
27. Kandambeth, S.; Shinde, D. B.; Panda, M. K.; Lukose, B.; Heine, T.; Banerjee, R., Enhancement of chemical stability and crystallinity in porphyrin-containing covalent organic frameworks by intramolecular hydrogen bonds. *Angew. Chem., Int. Ed.* 2013, 52 (49), 13052-13056.
28. Miorandi, D.; Sicari, S.; De Pellegrini, F.; Chlamtac, I., Internet of things: Vision, applications and research challenges. *Ad hoc Netw.* 2012, 10 (7), 1497-1516.

X. References of Sections II-VIII

1. Jiang, Z., GIXSGUI: a MATLAB Toolbox for Grazing-Incidence X-Ray Scattering Data Visualization and Reduction, and Indexing of Buried Three-Dimensional Periodic Nanostructured Films. *J. Appl. Crystallogr.* 2015, 48, 917-926.
2. Lyle, S. J.; Waller, P. J.; Yaghi, O. M., Covalent Organic Frameworks: Organic Chemistry Extended into Two and Three Dimensions. *Trends in Chemistry* 2019, 1, 172-184.
3. Korzdorfer, T.; Bredas, J.-L., Organic Electronic Materials: Recent Advances in the DFT Description of the Ground and Excited States Using Tuned Range-Separated Hybrid Functionals. *Acc. Chem. Res.* 2014, 47, 3284-3291.
4. Karolewski, A.; Stein, T.; Baer, R.; Kummel, S., Communication: Tailoring the Optical gap in Light-Harvesting Molecules. *J. Chem. Phys.* 2011, 134, 151101.
5. Martin, R. L., Natural Transition Orbitals. *J. Chem. Phys.* 2003, 118, 4775-4777.
6. Frisch, M. J.; Trucks, G.; Schlegel, H.; Scuseria, G.; Robb, M.; Cheeseman, J.; Scalmani, G.; Barone, V.; Mennucci, B.; Petersson, G., Gaussian 09, Revision D. 01, Gaussian. Inc.: Wallingford, CT 2009.
7. Kuhnert, N.; Lopez-Periago, A.; Rossignolo, G. M., The Synthesis and Conformation of Oxygenated Trianglimine Macrocycles. *Org. Biomol. Chem.* 2005, 3, 524-537.
8. Zhang, F.; Yin, S.; Liu, X.; Huang, W.; He, B., Synthesis of New Poly (p-phenylenevinylene) Derivatives with Improved Solubility. *Chin J. Polym. Sci.* 2000, 9, 129-137.

9. Okada, Y.; Sugai, M.; Chiba, K., Hydrogen-Bonding-Induced Fluorescence: Water-Soluble and Polarity-Independent Solvatochromic Fluorophores. *J. Org. Chem.* 2016, 81, 10922-10929.
10. Li, X.; Gao, Q.; Aneesh, J.; Xu, H.-S.; Chen, Z.; Tang, W.; Liu, C.; Shi, X.; Adarsh, K.; Lu, Y., Molecular Engineering of Bandgaps in Covalent Organic Frameworks. *Chem. Matter.* 2018, 30, 5743-5749.

We claim:

1. A sensor comprising a covalent organic framework (COF), the COF comprising (i) a tautomerically active subunit capable of reversible iminol-to-ketoenamine tautomerism between a first tautomer and a second tautomer, (ii) a linking group, and (iii) a means for regenerating the tautomerically active subunit from the second tautomer to the first tautomer and vice-versa,
   wherein the first tautomer has a first detectable characteristic and the second tautomer has a second detectable characteristic, the second detectable characteristic being detectably distinct from the first detectable characteristic, wherein the tautomerically active subunit is a dihydroxydialdehyde aryl.

2. The sensor of claim 1 further comprising an electromagnetic radiation source, a detector, a regeneration agent, a heating element, or any combination thereof.

3. The sensor of claim 2, wherein the sensor comprises the electromagnetic radiation source and the detector.

4. The sensor of claim 3, wherein the sensor comprises the regeneration agent or the heating element.

5. The sensor of claim 2, wherein the sensor comprises the regeneration agent or the heating element.

6. The sensor of claim 1, wherein
   the linking group is a trigonal planar, tetragonal planar, hexagonal planar, tetrahedral, or octahedral linking group.

7. The sensor of claim 6, wherein
   (i) the tautomerically active subunit is a substituted or unsubstituted 2,5 dihydroxyterephthaldehyde (PDA-OH), optionally substituted with a linear or branched alkyl, a liner or branched alkenyl, a linear or branched silyl, a cyclic alkyl, an aryl, or a heteroaryl and
   (ii) the linking group is 1,3,5-tris(aminophenyl)benzene (TAPB).

8. The sensor of claim 7, wherein the tautomerically active subunit is unsubstituted 2,5 dihydroxyterephthaldehyde (PDA-OH).

9. The sensor of claim 1, wherein the COF is a thin film.

10. The sensor of claim 1, wherein the sensor has a response time less than 10 seconds.

11. A method for detecting the presence of an analyte, the method comprising contacting a sample containing the analyte with the COF according to claim 1, and detecting the first detectable characteristic and/or the second detectable characteristic of the COF.

12. The method of claim 11, wherein the second detectable characteristic is detected in the presence of the analyte or the first detectable characteristic is detected in the absence of the analyte.

13. The method of claim 11 further comprising regenerating the COF.

14. The method of claim 13, wherein the first detectable characteristic is detected subsequent to the regeneration step.

15. The method of claim 13, wherein the second detectable characteristic is detected prior to and subsequent to the regeneration step.

16. The method of claim 13, wherein the sensor is regenerated passively.

17. The method of claim 13, wherein the sensor is regenerated by contacting the COF with a regeneration agent or by heating the COF.

18. The method of claim 17, wherein the regenerating agent is a nonpolar compound.

19. The method of claim 13, wherein the first detectable characteristic or the second detectable characteristic is detected colorimetrically.

20. The method of claim 13, wherein the first detectable characteristic or the second detectable characteristic is detected by irradiating the COF with electromagnetic radiation from a source and measuring a spectroscopic feature using a detector.

21. The method of claim 13, wherein the analyte has an $E_T N > 0.7$ and/or the analyte has a pKa<15.5.

* * * * *